(12) United States Patent
Kirchen et al.

(10) Patent No.: US 7,976,056 B2
(45) Date of Patent: Jul. 12, 2011

(54) FASTENER CLIP AND METHOD OF FABRICATING THE SAME

(75) Inventors: James T. Kirchen, Chippewa Falls, WI (US); Benjamin H. Moerke, Chippewa Falls, WI (US); Jesse L. Jensen, Chippewa Falls, WI (US); Brock T. Cooley, Boomer, WI (US); Adam C. Peterson, Chippewa Falls, WI (US); David W. Edland, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 12/598,316

(22) PCT Filed: May 8, 2008

(86) PCT No.: PCT/US2008/062981
§ 371 (c)(1),
(2), (4) Date: Oct. 30, 2009

(87) PCT Pub. No.: WO2008/141052
PCT Pub. Date: Nov. 20, 2008

(65) Prior Publication Data
US 2010/0072735 A1   Mar. 25, 2010

Related U.S. Application Data

(60) Provisional application No. 60/928,374, filed on May 9, 2007.

(51) Int. Cl.
*B60R 21/20* (2006.01)
(52) U.S. Cl. ............ 280/728.2; 280/730.2; 411/45; 411/549

(58) Field of Classification Search ............. 24/297, 24/453, 602, 326; 411/45–48, 508–510, 411/41, 349, 549, 550, 553; 280/728.2, 730.2
See application file for complete search history.

(56) References Cited

U.S. PATENT DOCUMENTS
4,422,222 A   12/1983   Notoya
(Continued)

FOREIGN PATENT DOCUMENTS
EP   1260719 A1   11/2002
(Continued)

OTHER PUBLICATIONS
ISR for PCT/US2009/049397, mailed Apr. 12, 2009.
(Continued)

*Primary Examiner* — Ruth Ilan
(74) *Attorney, Agent, or Firm* — Lowe Hauptman Ham & Berner, LLP

(57) ABSTRACT

A fastener clip includes a body having an opening extending therethrough, and a rigid retaining pin inserted through the opening, the rigid retaining pin having a first end secured within the body and a second end disposed outside the body, the retaining pin configured to limit the movement of a vehicle trim piece with respect to the vehicle chassis when an airbag is deployed. The fastener clip also includes a plurality of molding gates formed at an intersection between the body and the rigid retaining pin, the rigid retaining pin being subsequently movable with respect to the body after the molding gates are broken. The fastener clip further includes a pair of flexible retention legs adapted to secure the fastener clip to a vehicle chassis and a pair of flexible retention legs adapted to secure the trim piece to a vehicle chassis.

16 Claims, 18 Drawing Sheets

U.S. PATENT DOCUMENTS

| | | | |
|---|---|---|---|
| 4,629,356 A | 12/1986 | Hayashi | |
| 4,861,208 A | 8/1989 | Boundy | |
| 4,952,106 A | 8/1990 | Kubogochi et al. | |
| 5,342,126 A * | 8/1994 | Heston et al. | 374/208 |
| 5,775,860 A | 7/1998 | Meyer | |
| 6,431,585 B1 * | 8/2002 | Rickabus et al. | 280/728.3 |
| 6,514,023 B2 | 2/2003 | Moerke | |
| 6,594,870 B1 | 7/2003 | Lambrecht et al. | |
| 6,874,983 B2 | 4/2005 | Moerke et al. | |
| 6,932,552 B2 | 8/2005 | Anscher et al. | |
| 6,952,863 B2 | 10/2005 | Draggoo et al. | |
| 7,105,119 B2 * | 9/2006 | Kanie et al. | 264/238 |
| 7,736,107 B2 * | 6/2010 | Okada | 411/41 |
| 7,837,225 B2 * | 11/2010 | Gosis et al. | 280/730.2 |
| 2002/0021950 A1 * | 2/2002 | Ichikawa | 411/349 |
| 2002/0024206 A1 * | 2/2002 | Nagasawa et al. | 280/735 |
| 2004/0175250 A1 * | 9/2004 | Yoneoka | 411/45 |
| 2005/0062263 A1 * | 3/2005 | Kawai et al. | 280/728.2 |
| 2008/0014045 A1 * | 1/2008 | Kawai | 411/45 |
| 2008/0141052 A1 | 6/2008 | Thelemann et al. | |

FOREIGN PATENT DOCUMENTS

| | | |
|---|---|---|
| GB | 2362427 A | 11/2001 |

OTHER PUBLICATIONS

ISR for PCT/US2008/062981 mailed Aug. 27, 2008.

* cited by examiner

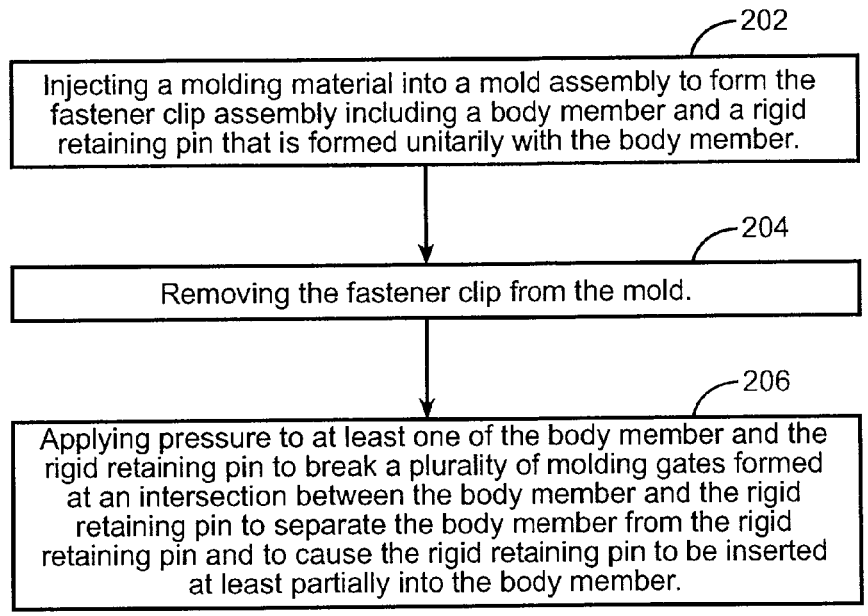
FIG. 9
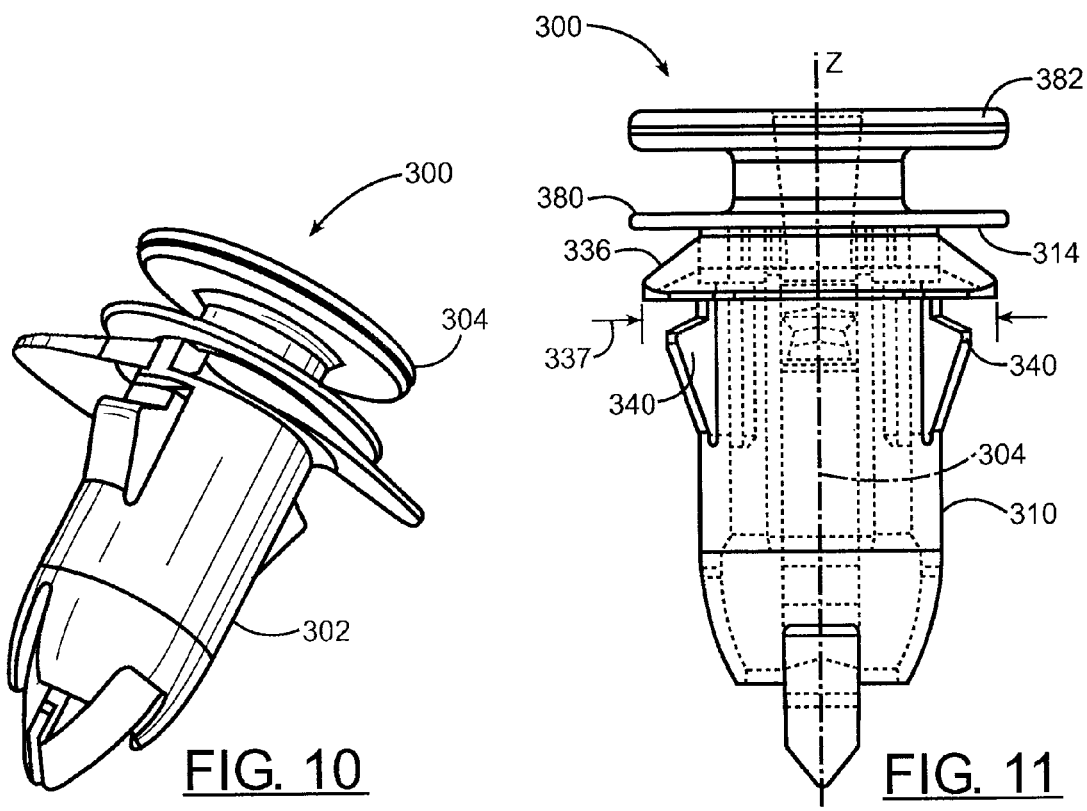
FIG. 10
FIG. 11

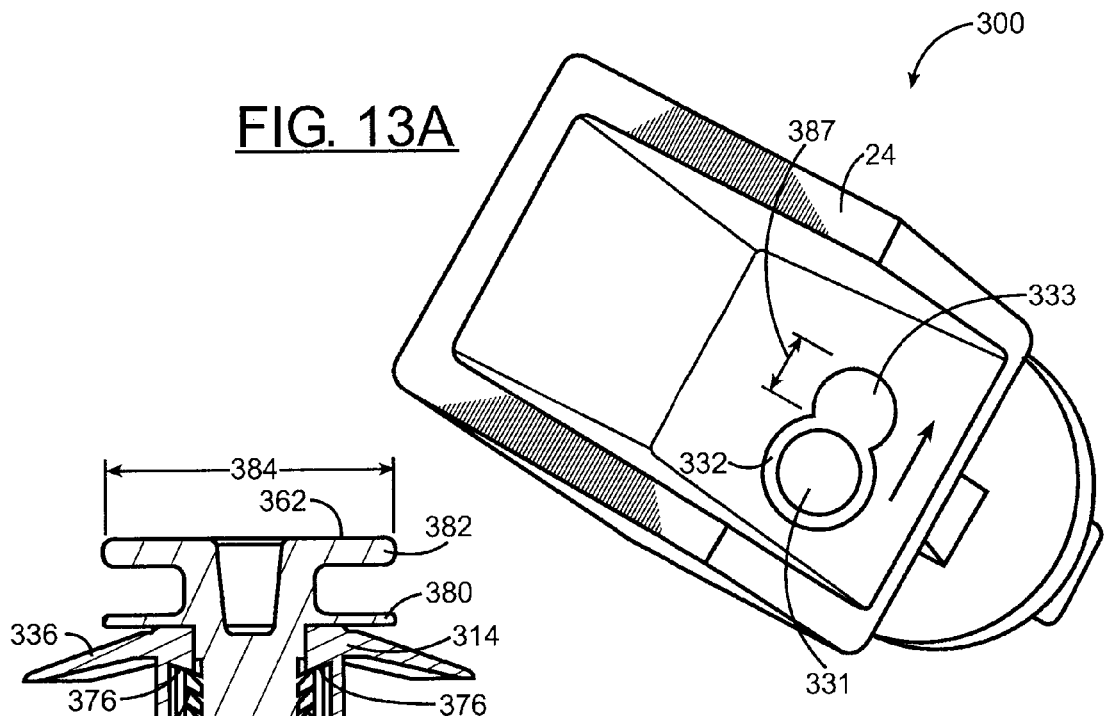
FIG. 13A
FIG. 12
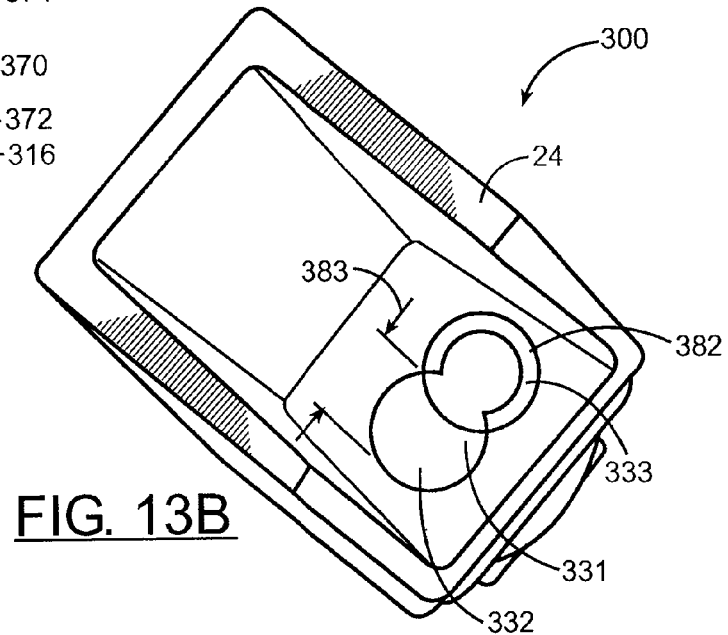
FIG. 13B

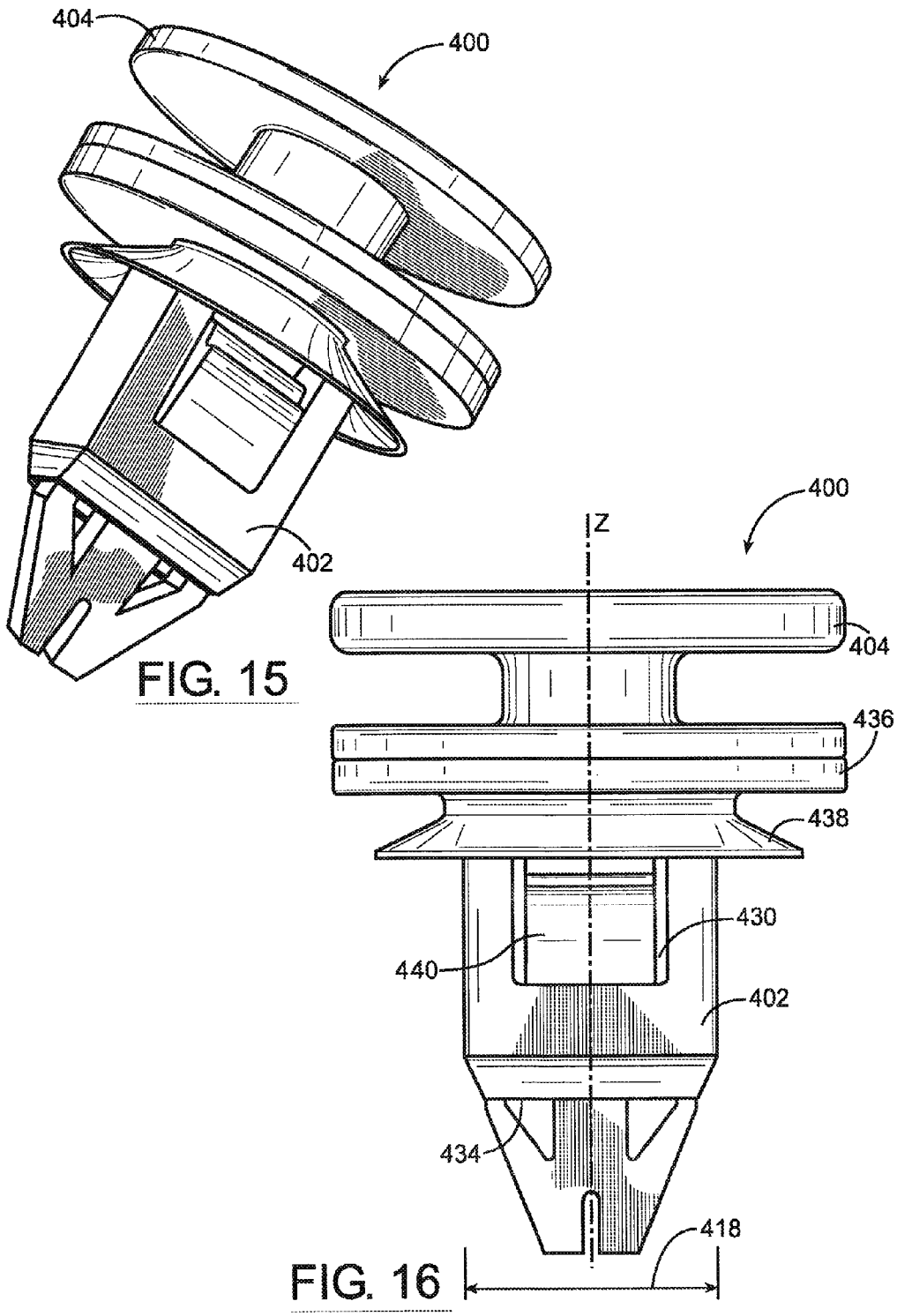

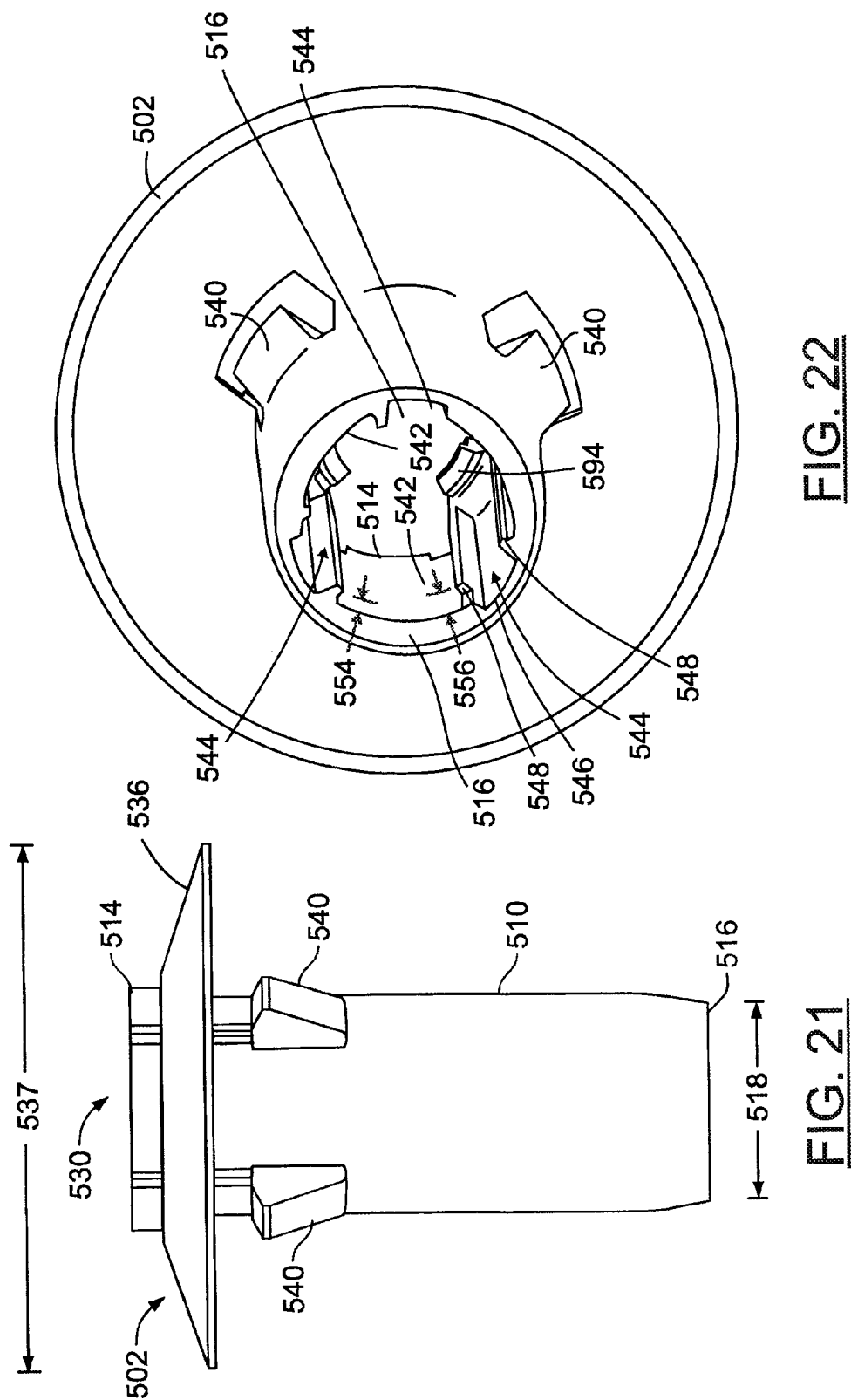

FASTENER CLIP AND METHOD OF FABRICATING THE SAME

CROSS REFERENCE TO RELATED APPLICATION

This application is a phase of PCT/US2008/062981 filed May 8, 2008 and claims benefit to U.S. Provisional Application Ser. No. 60/928,374 filed on May 9, 2007, the disclosures of which are hereby incorporated by reference herein in their entirety. matter of which is expressly incorporated herein in its entirety.

BACKGROUND OF THE INVENTION

The present invention relates generally to fasteners, and more particularly to side airbag retention systems and fasteners therefore.

Supplemental restraint systems or airbags have become an important safety feature in today's automobiles. At least one known supplemental restraint system includes a driver's side airbag that is mounted in the steering column and a passenger side airbag that is mounted in the vehicle dashboard. To further increase passenger safety, at least some known vehicles include a side airbag inflatable curtain system (SABIC). The SABIC system is installed within the vehicle using a side airbag retention system.

At least one known side airbag retention system includes a panel member having several openings therethrough. Prior to the airbag being deployed, the panel member covers and protects the side airbag. The panel member is generally attached to the vehicle chassis using a plurality of known fasteners that are inserted through the panel member to secure the panel member to the vehicle chassis. During operation, when the side airbag is deployed, the panel member separates from the vehicle chassis and may become a projectile. To enable the panel member to separate from the chassis and thus allow the airbag to deploy, at least one known fastener includes a tether.

More specifically, the known fastener includes a housing having a hollow interior to receive the tether. The known tether is fabricated using a flexible fiber material. The tether also has a predetermined length that is based on the amount of separation desired between the vehicle chassis and the panel member. For example, assuming the tether has a length of one one-half inch, when the airbag is deployed, the tether will limit the movement between the chassis and the panel member to one-half inch. Since, the size of the opening in the fastener housing is less than the length of the tether, the tether is bent or coiled to fit within the fastener housing.

However, assuming that a customer desires that the panel member be displaced by one inch during deployment, the length of the tether must also be increased. As a result, either the height of the fastener housing must be increased to accept the tether having the increased length or the tether must be more tightly stored within the known fastener housing. Increasing the height of the fastener housing may cause the fastener housing to extend into the passenger area causing the passenger to inadvertently strike the fastener. However, maintaining the size of the known fastener housing results in a tether, having an increased length, being stored in the fastener housing. In either configuration, the known tether is deformed in the stowed position, causing increase stress to the tether that may weaken the tether causing the tether to break when the airbag is deployed. Additionally, increased force may be applied to the fastener housing by the tether in the stowed position causing the fastener housing to separate from the chassis when the airbag is not deployed.

A need remains for a fastener clip that performs the intended function of holding the panel member to the vehicle chassis and while allowing the panel member to separate but not completely detach from the vehicle chassis, while also eliminating the need for a tether to secure the panel member when the airbag is deployed.

BRIEF DESCRIPTION OF THE INVENTION

In one embodiment, a fastener clip adapted to secure a trim piece to a vehicle chassis is provided. The fastener clip includes a body having an opening extending therethrough, and a rigid retaining pin inserted through the opening. The rigid retaining pin has a first end secured within the body and a second end disposed outside the body. The rigid retaining pin is configured to limit the movement of a vehicle trim piece with respect to the vehicle chassis when an airbag is deployed. The fastener clip also includes a plurality of molding gates formed at an intersection between the body and the rigid retaining pin, the rigid retaining pin being subsequently movable with respect to the body after the molding gates are broken. The fastener clip further includes a pair of flexible retention legs adapted to secure the fastener clip to a vehicle chassis and a pair of flexible retention legs adapted to secure the trim piece to a vehicle chassis.

In another embodiment, a method of fabricating a fastener clip assembly is provided. The method includes injecting a molding material into a mold assembly to form the fastener clip assembly including a body member and a rigid retaining pin that is formed unitarily with the body member. The method also includes removing the fastener clip from the mold, and applying pressure to at least one of the body member and the rigid retaining pin to break a plurality of molding gates formed at an intersection between the body member and the rigid retaining pin to separate the body member from the rigid retaining pin and to cause the rigid retaining pin to be inserted at least partially into the body member.

In a further embodiment, a side airbag retention system for use in conjunction with a vehicle is provided. The vehicle includes a vehicle chassis, an airbag coupled to the vehicle chassis, and a trim piece adapted to cover the airbag. The airbag retention system also includes a fastener clip adapted to secure a trim piece to a vehicle chassis is provided. The fastener clip includes a body having an opening extending therethrough, and a rigid retaining pin inserted through the opening. The rigid retaining pin has a first end secured within the body and a second end disposed outside the body. The rigid retaining pin is configured to limit the movement of a vehicle trim piece with respect to the vehicle chassis when an airbag is deployed. The fastener clip also includes a plurality of molding gates formed at an intersection between the body and the rigid retaining pin, the rigid retaining pin being subsequently movable with respect to the body after the molding gates are broken. The fastener clip further includes a pair of flexible retention legs adapted to secure the fastener clip to a vehicle chassis and a pair of flexible retention legs adapted to secure the trim piece to a vehicle chassis.

Other features and advantages of the invention will become apparent to those skilled in the art upon review of the following detailed description, claims and drawings in which like numerals are used to designate like features.

BRIEF DESCRIPTION OF THE DRAWINGS

FIG. 9 is a method of fabricating an exemplary fastener clip in accordance with an embodiment of the present invention.

FIG. 10 is a perspective view of another exemplary fastener clip in accordance with an embodiment of the present invention.

FIG. 11 is a side section view of the exemplary fastener clip shown in FIG. 10 in accordance with an embodiment of the present invention.

FIG. 12 is another side section view of the exemplary fastener clip shown in FIG. 10 in accordance with an embodiment of the present invention.

FIG. 13A is a perspective view of the exemplary fastener clip shown in FIG. 10 in an installation position in accordance with an embodiment of the present invention.

FIG. 13B is a perspective view of the exemplary fastener clip shown in FIG. 10 in an installed position in accordance with an embodiment of the present invention.

FIG. 15 is a perspective view of another exemplary fastener clip in accordance with an embodiment of the present invention.

FIG. 16 is a side section view of the exemplary fastener clip shown in FIG. 15 in accordance with an embodiment of the present invention.

FIG. 21 is a side view of a portion of the exemplary fastener clip shown in FIG. 20 in accordance with an embodiment of the present invention.

FIG. 22 is a bottom view of the portion of the exemplary fastener clip shown in FIG. 21.

Figure 1:
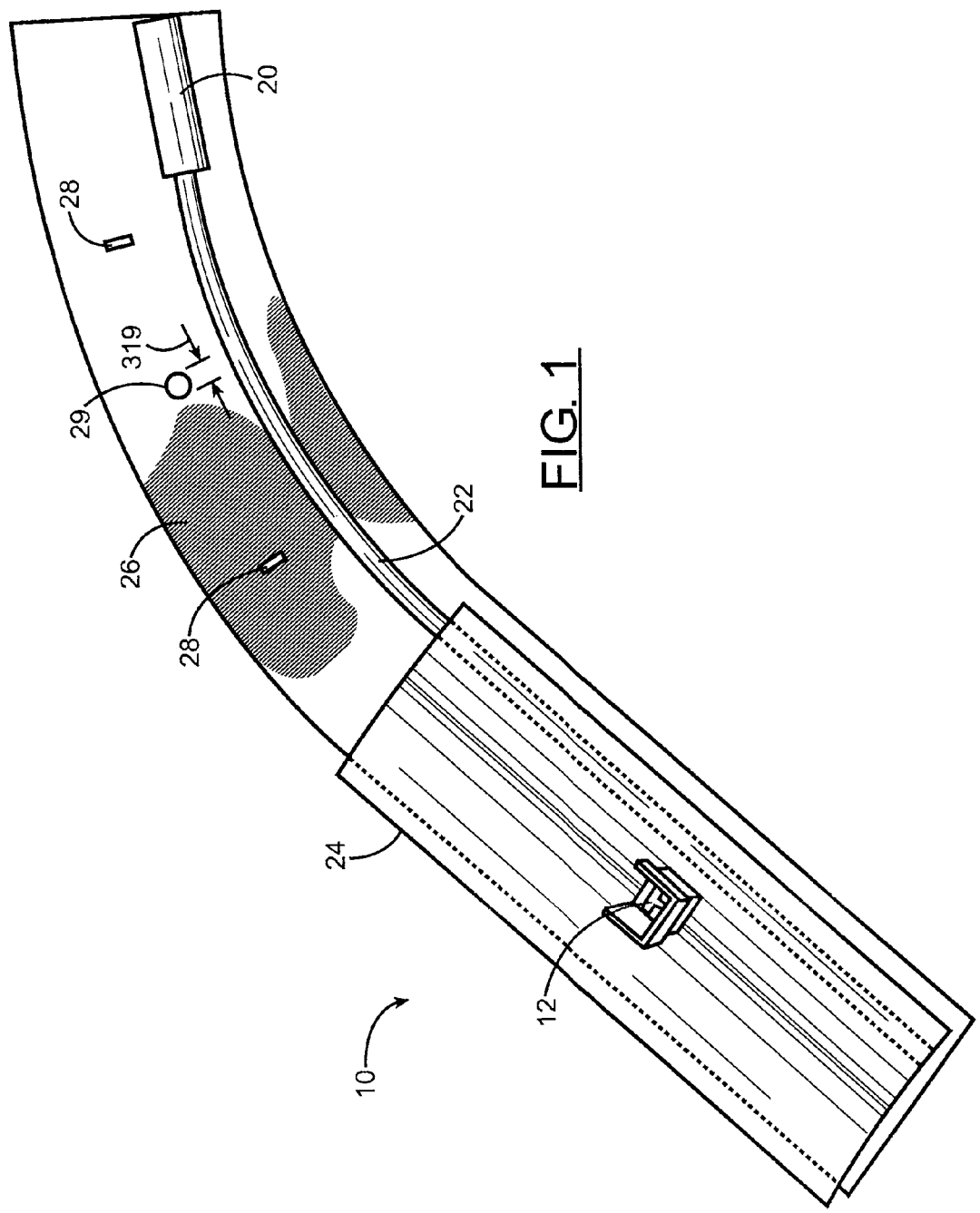
FIG. 1 is a partial cut-away view of an exemplary airbag retention assembly in accordance with an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

FIG. 1 is a cut-away view of an exemplary airbag retention assembly 10 that includes a plurality of exemplary fastener clips 12 in accordance with an embodiment of the present invention. Although the fastener clips have been described in connection with an airbag retention system, the fastener clips 12 described herein are capable of use in other applications, and the airbag retention assembly 10 is merely shown and described as an example of one such application.

The airbag retention assembly 10 includes an airbag 20, an airbag tether 22, and a trim piece 24. As shown in FIG. 1, a portion of the trim piece 24 has been removed to illustrate the airbag 20 and the airbag tether 22 installed beneath the trim piece 24. In the exemplary embodiment, the airbag 20 is secured to a vehicle chassis 26 via the airbag tether 22. The airbag retention assembly 10 also includes the plurality of fastener clips 12. In the exemplary embodiment, the vehicle chassis 26 includes a plurality of openings 28 and 29 that are each sized to receive a single fastener clip 12 therethrough. In one mode of operation, referred to herein as the airbag stowed mode, the fastener clips 12 restrain the trim piece 24 against the vehicle chassis 26 as shown in FIG. 1. In another mode of operation, the fastener clips 12 enable the trim piece 24 to separate but not completely detach from the vehicle chassis 26, when the airbag is deployed as shown below in FIGS. 8 and 14.

Figure 2:
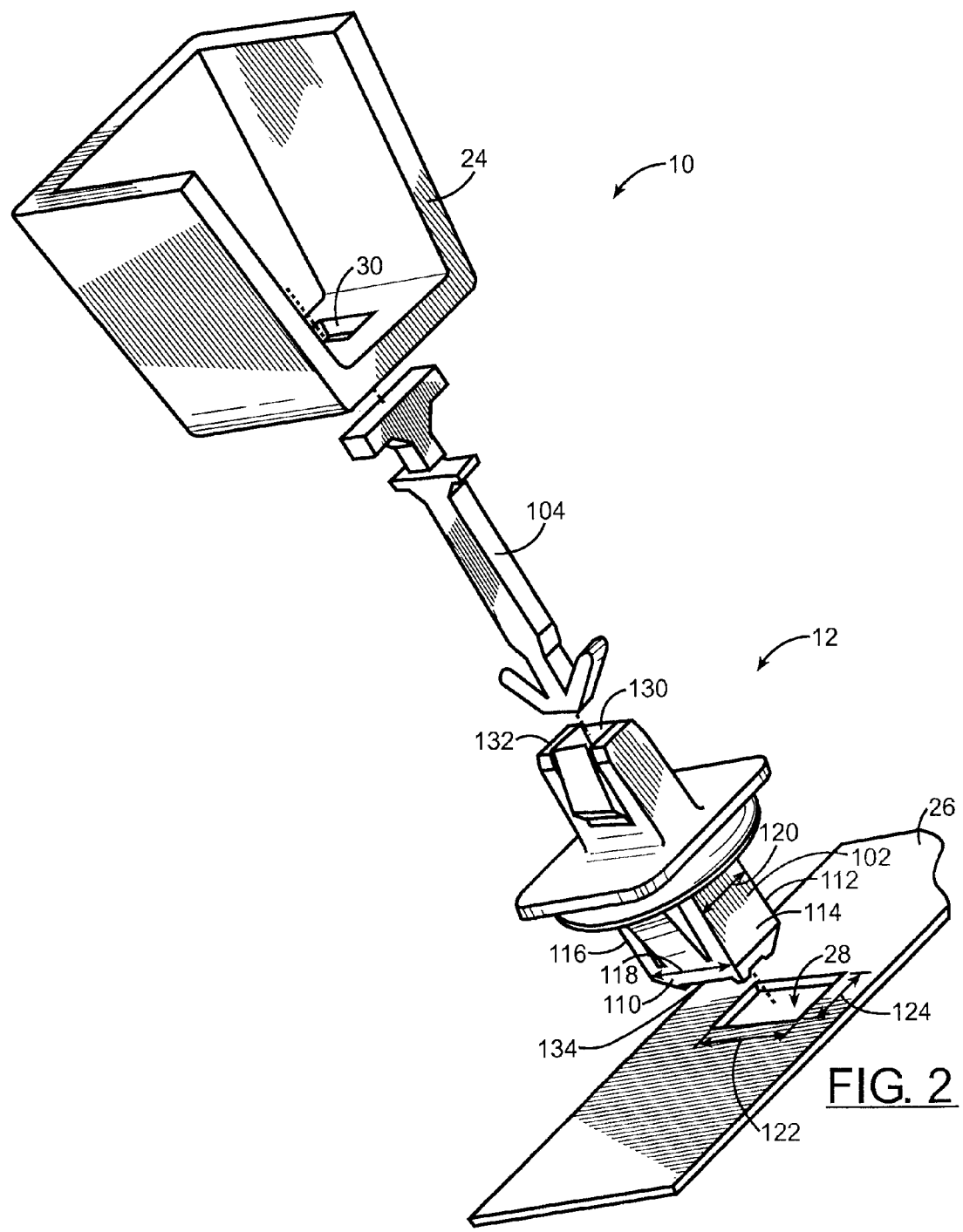
FIG. 2 is an exploded view of the airbag retention assembly shown in FIG. 1 that includes an exemplary fastener clip in accordance with an embodiment of the present invention.

FIG. 2 is an exploded view of a portion of the airbag retention assembly 10 shown in FIG. 1 that includes the exemplary fastener clip 12 in accordance with an embodiment of the present invention. The fastener clip 12 includes a body member 102 and a rigid retaining pin 104. In the exemplary embodiment, the body member 102 and the retaining pin 104 are each fabricated from a plastic material as a unitary structure and then separated to form the fastener clip 12 as discussed below. As such, both the body member 102 and the retaining pin 104, and all components included in each, are fabricated as part of a unitary structure to form fastener clip 12. Optionally, the body member 102 and the retaining pin 104 may be fabricated as separate components that are coupled together to form fastener clip 12.

In the exemplary embodiment, the body member 102 has a rectangular cross-sectional profile to enable the fastener clip 12 to be at least partially inserted into the opening 28 in the vehicle chassis 26 and an opening 30 in the trim piece 24 which will be discussed below. It should be realized that the body member 102 may have any shape that enables the fastener clip 12 to be inserted into the opening 28. The body member 102 has a first side 110, a second side 112 disposed approximately parallel to the first side 110. The body member 102 also has a third side 114 and a fourth side 116 that is approximately parallel to the third side 114. Both third and fourth sides 114 and 116 are disposed approximately perpendicular to first and second sides 110 and 112. As such, body member 102 has a substantially rectangular cross-sectional profile having length 118 and a width 120 that is less than the length 118. Moreover, opening 28 is substantially rectangular and has a length 122 and a width 124.

As shown in FIG. 2, the length 118 and width 120 of the body member 102 is slightly less than the length 122 and width 124 of opening 28 to enable the fastener clip 12 to be at least partially inserted into the opening 28 in the vehicle chassis 26. The sides 110, 112, 114, and 116 that form body member 102 also define an opening 130 that extends through the fastener body member 102. The fastener body opening 130 is configured to receive the retaining pin 104 therein. As such, the fastener body opening 130 extends from an upper surface 132 to a lower surface 134 of the body member 102.

Figure 3:
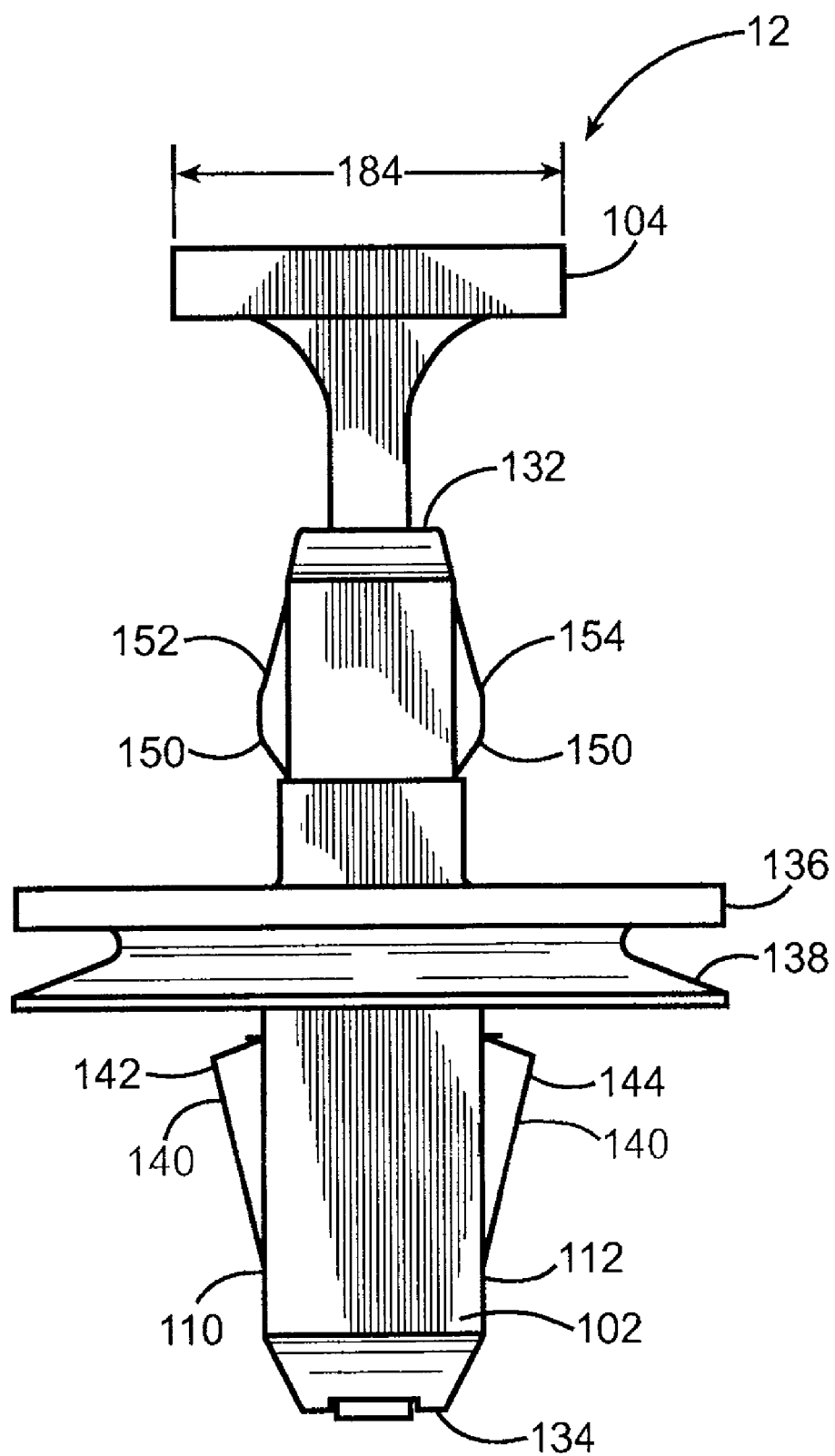
FIG. 3 is a section view of the exemplary fastener clip shown in FIG. 2 in accordance with an embodiment of the present invention.

FIG. 3 is a side section view of the exemplary fastener clip 12 shown in FIG. 2 in accordance with an embodiment of the present invention. The body member 102 also includes a flange member 136 that is disposed approximately midpoint between the upper and lower surfaces 132, 134 of the body member 102. As shown in FIG. 3, the flange member 136 extends radially outwardly from the body member 102. In use, the flange member 136 increases the strength and rigidity of the fastener clip 12 and also functions as a stop device when inserted into the trim opening 28. More specifically, since the flange member 136 has a dimension that is larger than the size of the opening 28, the flange member 136 limits the travel of the fastener clip 12 when the fastener clip 12 is installed into opening 28 which will be discussed below. The body member 102 may also includes a flexible member 138 that is formed between the flange member 136 and the lower surface 134. In the exemplary embodiment, the flexible member 138 is concave and has a circular cross-sectional profile. The flexible member 138 is configured to deform when the fastener clip 12 is installed into the opening 28. This deformation results in a slight pressure being exerted between the vehicle chassis 26 and the fastener clip 12 to limit movement of the fastener clip 12 when installed in the opening 28.

The fastener clip 12 also includes a first pair of flexible retention legs 140 that are formed between the flexible member 138 and the lower surface 134. More specifically, the fastener clip 12 includes a first retention leg 142 that is formed in the first side 110 of body member 102 and a second retention leg 144 that is formed in the second side 112 of body member 102. As shown in FIG. 3, the pair of retention legs 140 each have a triangular shape to enable the fastener clip 12 to be inserted within the opening 28 while also retaining the fastener clip 12 within opening 28. It should be realized that the pair of retention legs 140 may have any shape that enables the fastener clip 12 to be inserted and retained within the opening 28. More specifically, the pair of retention legs 140 deform inwardly towards body member 102 to enable the fastener clip 12 to be inserted into opening 28. After the fastener clip 12 is inserted into opening 28, the pair of retention legs 140 deform outwardly from body member 102 to enable the fastener clip 12 to be retained within opening 28.

The fastener clip 12 also includes a second pair of flexible retention legs 150 that are formed between the flange member 136 and the upper surface 132 of body member 102. More specifically, the fastener clip 12 includes a third retention leg 152 that is formed in the first side 110 of body member 102 and a fourth retention leg 154 that is formed in the second side 112 of body member 102. As shown in FIG. 3, the pair of retention legs 150 each have a triangular shape to enable the fastener clip 12 to be inserted within the trim piece opening 30 while also securing the trim piece 24 to the fastener clip 12 and thus securing the trim piece 24 to the vehicle chassis 26. It should be realized that the pair of retention legs 150 may have any shape that enables the fastener clip 12 to be inserted and retained within the opening 30. During operation, the pair of retention legs 150 deform inwardly towards body member 102 to enable the fastener clip 12 to be inserted into the trim piece opening 30. After the fastener clip 12 is inserted into the trim piece opening 30, the pair of retention legs 150 deform outwardly from body member 102 to securely couple the trim piece 24 to the vehicle chassis 26 via the fastener clip 12.

Figure 4A:
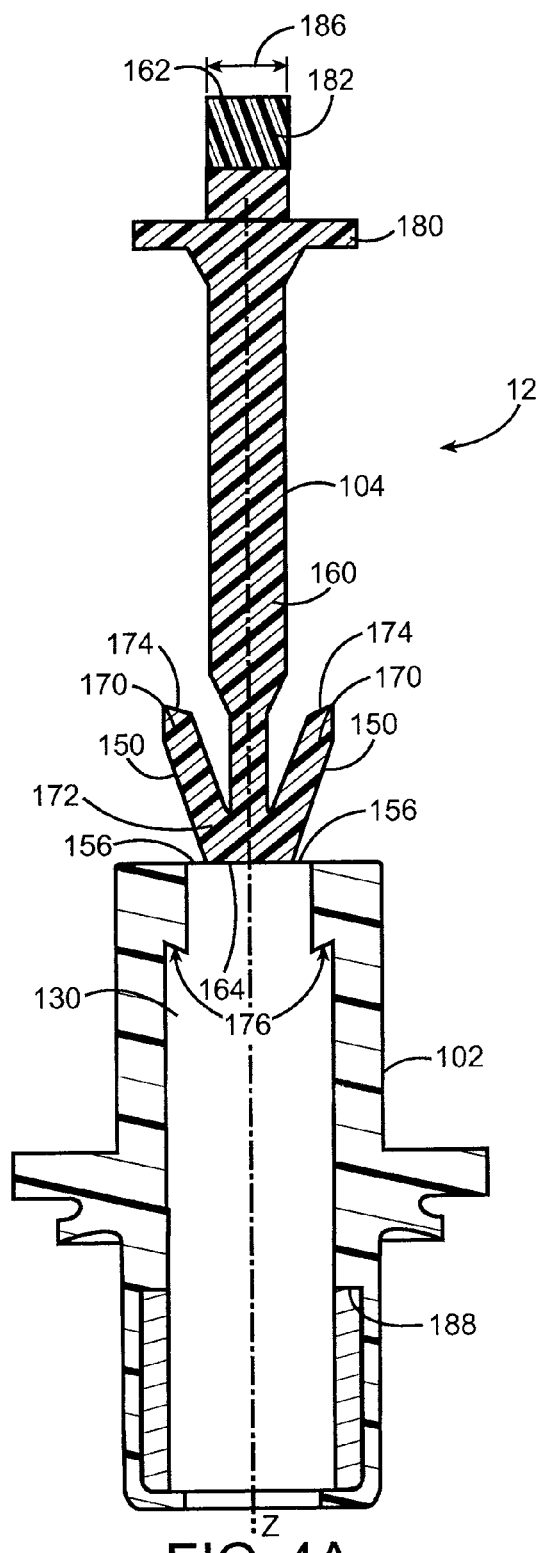
FIGS. 4A and B are section views of the exemplary fastener clip shown in FIG. 3 in accordance with an embodiment of the present invention.
Figure 4B:
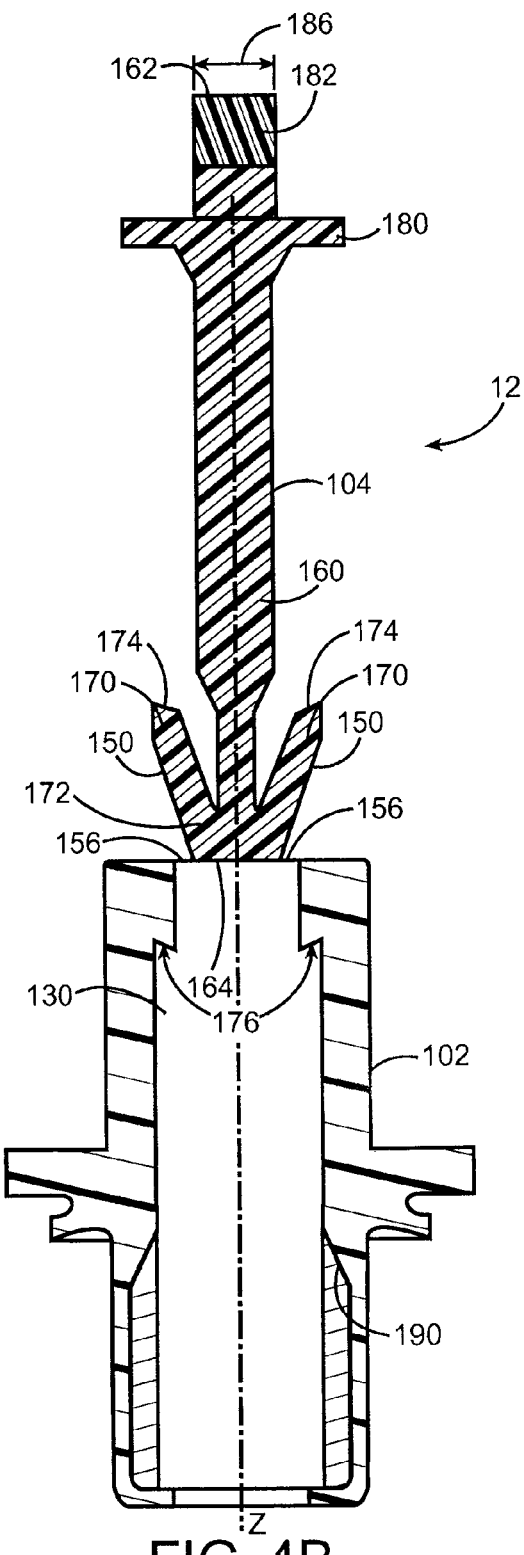

FIGS. 4A and 4B are side section views of the exemplary fastener clip 12 in a molding position in accordance with an embodiment of the invention. Specifically, the molding position illustrates the position of fastener clip 12 after completion of the molding process. As discussed above, the fastener clip 12 is fabricated from a plastic material as a unitary structure, as such, both the body member 102 and the retaining pin 104, and all components included in each, are fabricated as part of the unitary structure of fastener clip 12.

In the molding position, the body member 102 is aligned with the retaining pin 104 along a common axis, shown in FIGS. 4A and 4B as the Z-axis. During the molding process, common molding gates are formed at an intersection between the body member 102 and the retaining pin 104. This initially results in vestiges 156 being formed at the intersection between the body member 102 and the retaining pin 104. After the molding process is completed, the molding gates or vestiges 156 are broken by moving the retaining pin 104 along the Z-axis with respect to the body member 102. Specifically, the retaining pin 104 is forced into the fastener body opening 130.

The retaining pin 104 includes a rectangular body 160 having a first end 162 and a second end 164. The retaining pin body 160 is substantially rectangular to enable the retaining pin 104 to be inserted into the rectangular fastener body opening 130. During operation, the rectangular shape of both the fastener body opening 130 and the retaining pin body 160 substantially limit the rotational movement of the retaining pin 104 with respect to the body member 102. Thus the retaining pin 104 is configured to move only along a Z-axis as shown in FIG. 4.

The retaining pin 104 also includes a pair of catch members 170 that are disposed proximate to the retaining pin second end 164. In the exemplary embodiment, the combination of the retaining pin second end 164 and the catch members 170 form a substantially arrow-shaped member. The catch members 170 each have a first end 172 that is formed unitarily with the retaining pin second end 164 and a second end 174 that extends outwardly from the retaining pin body 160. In operation, the catch members 170 enable the retaining pin 104 to be inserted into the fastener body opening 130 while also securing the retaining pin 104 within the body member 102.

For example, after the molding process is completed, a portion of the retaining pin 104 that includes the pair of catch members 170, is forced through the fastener body opening 130 until the pair of catch members 170 are positioned past a pair of stops 176. The pair of stops 176 then prohibit the retaining pin 104 from being removed from the body member 102 after the retaining pin 104 has been inserted therein. The catch members 170 deform inwardly towards body member 102 to enable the retaining pin 104 to be inserted into the body member 102. After the retaining pin 104 is inserted into the body member 102, the retaining pin 104 passes by the pair of stops 176 and catches on a pair of ledges or stops 188 shown in FIG. 4A. Optionally, the retaining pin 104 passes by a pair of ramps 190 (shown in FIG. 4B. Upon deployment, the retaining pin 104 slides outwardly from the retaining pin body 160 and catches the pair of stops 176 formed on an inner surface of the body member 102.

Figure 5:
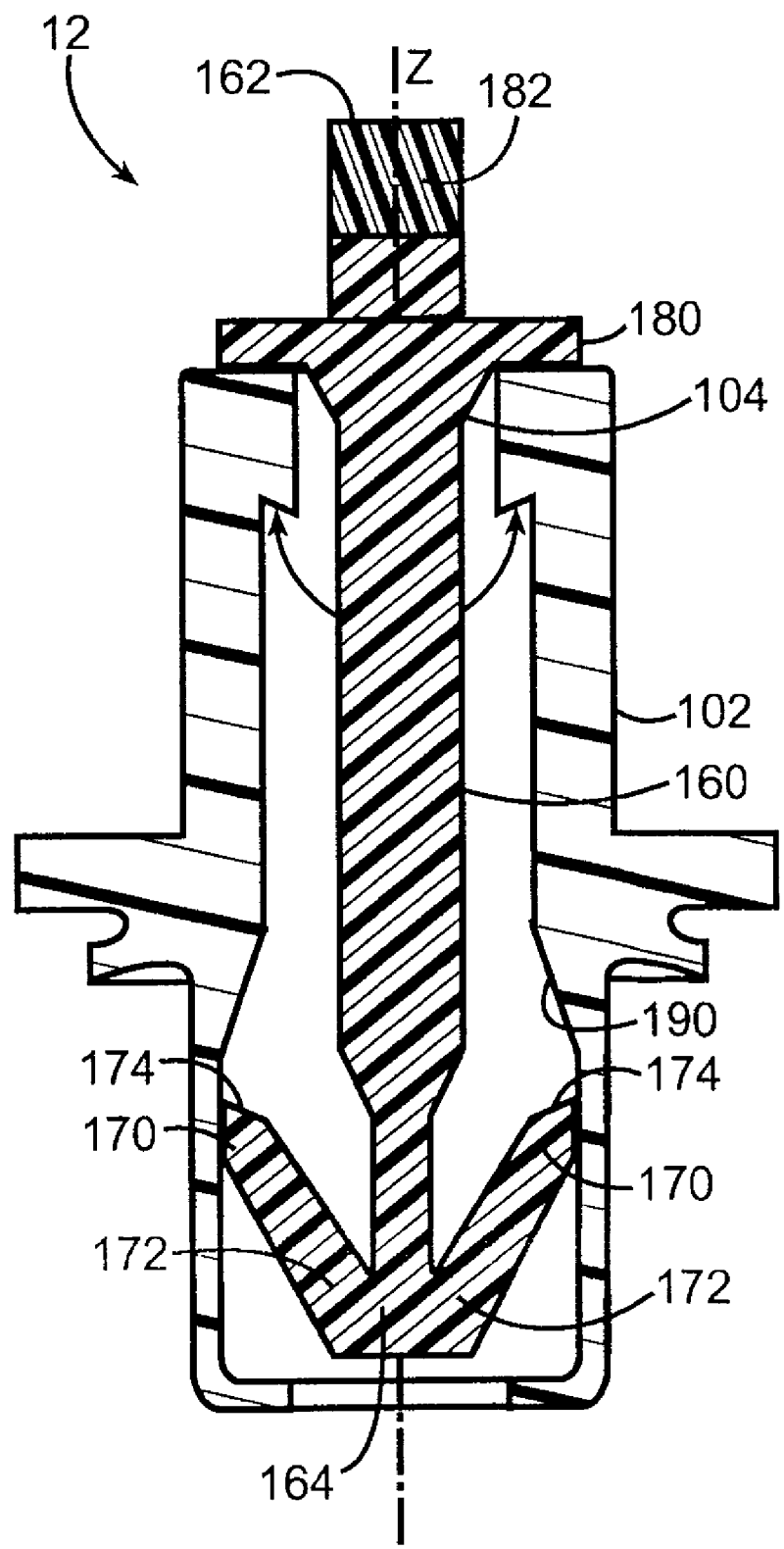
FIG. 5 is another section view of the exemplary fastener clip shown in FIG. 3 in accordance with an embodiment of the present invention.

FIG. 5 is a side section view of the exemplary fastener clip 12 in a pre-installation position. Specifically, FIG. 5 illustrates the fastener clip 12 after the molding vestiges 156 have been broken as discussed in FIG. 4. As shown in FIG. 5, the retaining pin 104 also includes a shoulder 180 that is formed between the catch members 170 and the retaining pin first end 162. In the exemplary embodiment, the shoulder 180 is positioned a predetermined distance from the catch member second ends 174. For example, assuming that it is desired that the trim piece 24 separate from the vehicle chassis 26 by approximately one inch when the airbag is deployed, the shoulder 180 is positioned approximately one inch from the catch member second ends 174. Optionally, retaining pin 104 does not include the shoulder 180. The shoulder 180 may be formed anywhere along the retaining pin 104 between the catch members 170 and the retaining pin first end 162. For example, to increase the distance that the trim piece 24 separates from the chassis 26, the shoulder 180 may be formed nearer the retaining pin first end 162. Optionally, to decrease the distance that the trim piece 24 separates from the chassis 26, the shoulder 180 may be formed nearer the catch members 170.

The retaining pin 104 also includes a trim stop 182 that is disposed on the retaining pin first end 162. As shown in FIG. 2, the trim stop 182 is disposed approximately perpendicular to the shoulder 180, the body member 102, and thus the fastener body opening 130. The trim stop 182 is substantially rectangular and includes a length 184 and a width 186 as shown in FIG. 4. Optionally, the trim stop 182 may be any shape. In the exemplary embodiment, the length 184 and width 186 of the trim stop 182 is slightly less than the length and width of the trim piece opening 30 to enable the trim stop 182 to be inserted through the trim piece opening 30 during installation.

Figure 6A:
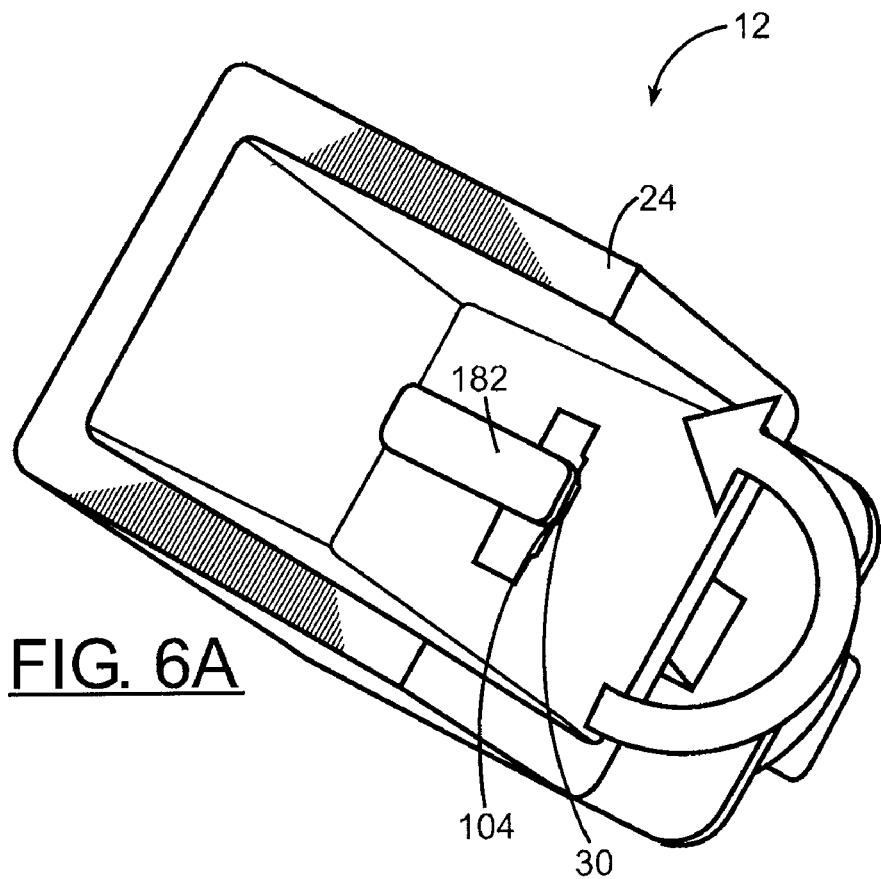
FIG. 6A is a perspective view of the exemplary fastener clip shown in FIG. 3 in an installation position in accordance with an embodiment of the present invention.
Figure 6B:
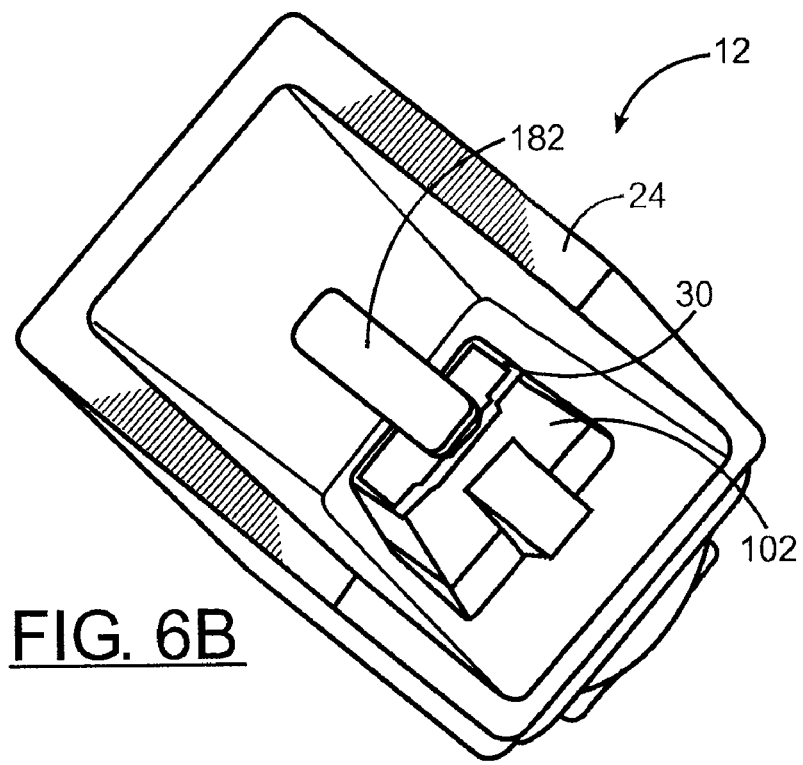
FIG. 6B is a perspective view of the exemplary fastener clip shown in FIG. 3 in an installed position in accordance with an embodiment of the present invention.
Figure 7:
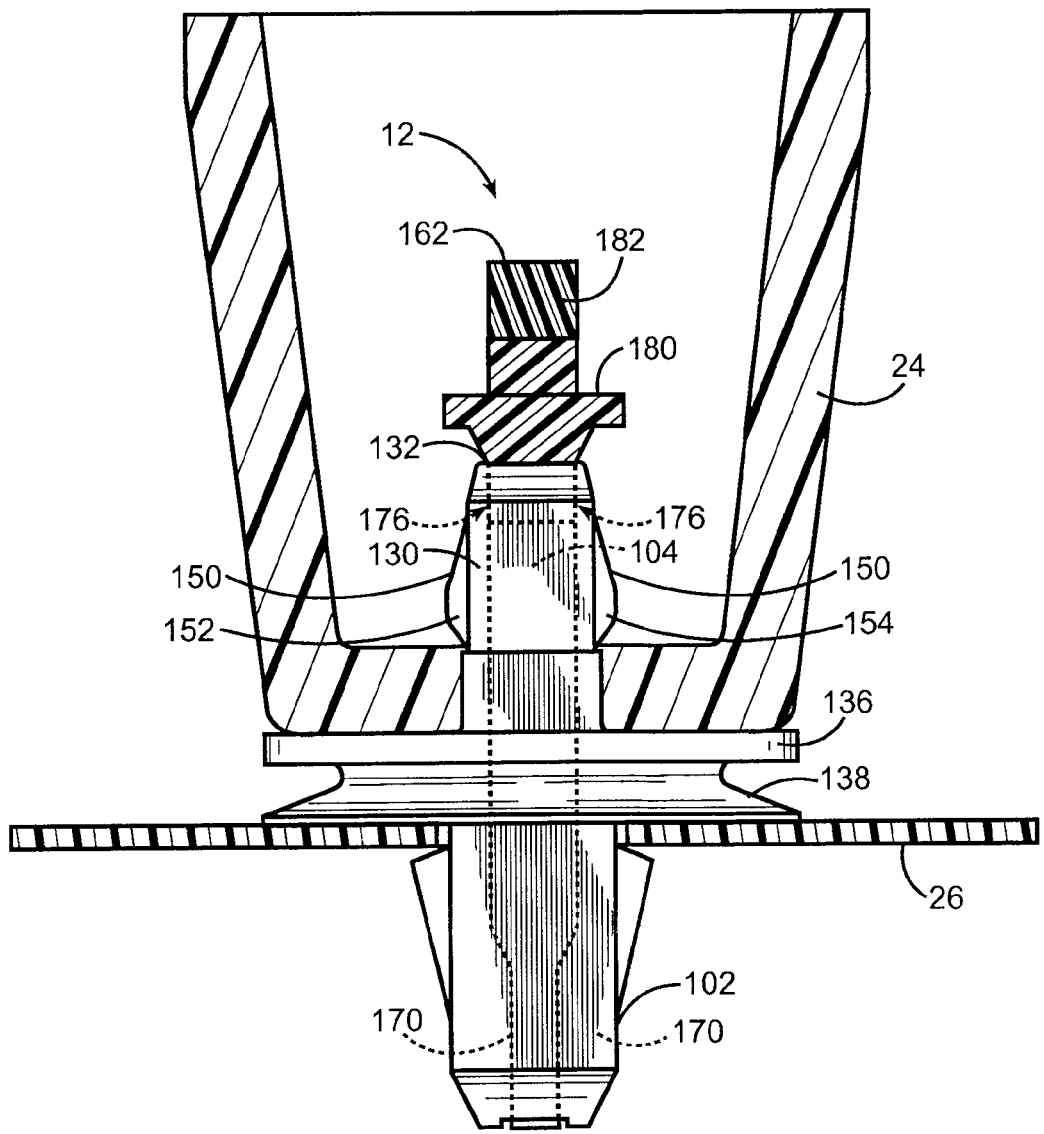
FIG. 7 is a side view of an exemplary airbag retention system that include the fastener clip shown in FIGS. 2-6 in a first operational position in accordance with an embodiment of the present invention.

For example, FIG. 6A illustrates a portion of the fastener clip 12 inserted through the trim piece opening 30. FIG. 6B illustrates the fastener clip 12 coupled to trim piece 24. As shown in FIG. 6A, and in the exemplary embodiment, the trim stop 182 is inserted through the trim piece opening 30. The fastener clip 12, including trim stop 182 is then rotated approximately 90 degrees until the fastener member body 102 is aligned with the opening 30. The fastener clip 12 is then fully inserted into the trim piece opening 30 until the pair of retention legs 150 pass through the trim piece opening 30 and thus couple the fastener clip 12 to the trim piece 24 as shown in FIG. 6B. The trim piece assembly, i.e. the trim piece 24 and fastener clip 12 may then be coupled to the vehicle chassis 26 using the pair of retention legs 140, as shown in FIG. 7. Optionally, the fastener clip 12 may first be coupled to the chassis 26. The trim piece 24 may then be coupled to the fastener clip 12 as described above.

Figure 8:
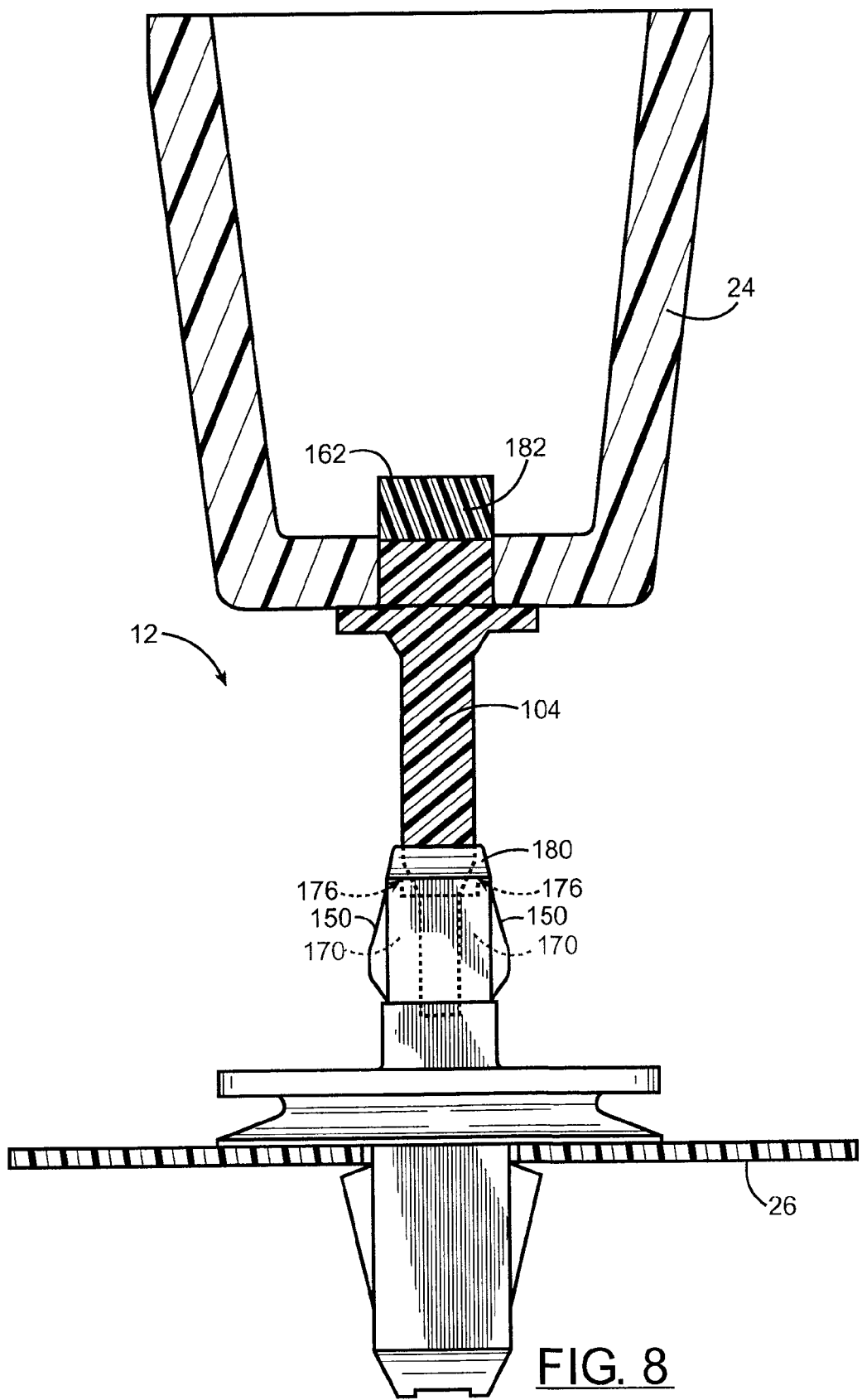
FIG. 8 is a side view of an exemplary airbag retention system that include the fastener clip shown in FIGS. 2-6 in a second operational position in accordance with an embodiment of the present invention.

FIG. 7 illustrates the fastener clip 12 in a non-deployed or standby position. FIG. 8 illustrates the fastener clip 12 in a deployed position. As shown in FIG. 7, in the standby position, the retaining pin 104 is fully inserted into the fastener body opening 130. More specifically, the retaining pin 104 is inserted into the fastener body opening 130 until the retaining pin shoulder 180 contacts the upper surface 132 of the fastener body as shown in FIG. 7. As discussed above, the shoulder 180 provides a positive stop for the retaining pin 104 when the retaining pin is inserted into the fastener body opening 130. When the airbag 20 is deployed, i.e. a predetermined force is applied to the trim piece 24, the trim piece 24 moves away from the vehicle chassis 26 as shown in FIG. 8. More specifically, the trim piece 24 disengages or detaches from the pair of retention legs 150 and moves outwardly from the chassis 26. As shown in FIG. 8, the trim piece 24 moves away from the vehicle chassis 26 until the trim piece 24 contacts the trim stop 182. At this point, both the trim piece 24 and the retaining pin 104 move away from the chassis. This movement continues, until the pair of catch members 170 make contact with the pair of stops 176. The pair of stops 176 then prohibit the retaining pin 104, and thus the trim piece 24 from moving further from the chassis. As a result, the retaining pin 104 prevents the trim piece 24 from moving a distance from the vehicle chassis 26 that is greater than the predefined distance as discussed above. At this time, the trim piece 24 is prevented from moving away from the chassis by a distance that exceeds a predetermined value by the trim stop 182 of the fastener clip 12.

FIG. 9 is a method 200 for fabricating a fastener clip assembly. The method 200 includes injecting 202 a molding material into a mold assembly to form the fastener clip assembly including a body member and a rigid retaining pin that is formed unitarily with the body member. This initially results in an integral piece. The fastener clip 12 is then removed 204 from the mold. The method also includes applying pressure 206 to at least one of the body member and the rigid retaining pin to break a plurality of molding gates formed at an intersection between the body member and the rigid retaining pin to separate the body member from the rigid retaining pin and to cause the rigid retaining pin to be inserted at least partially into the body member.

For example, during fabrication, the fastener clip 12 is molded as a unitary assembly that can achieve movement after breaking its molding gates or vestiges 156 in such a way that once it leaves its molding position, the body member 102 is separated from the retaining pin 104. More specifically, pressure is applied along the Z-axis of the fastener clip 12, to at least one of the body member 102 and the rigid retaining pin 104 to break the molding gates 156. The pressure not only breaks the molding gates but forces the retaining pin 104 to be inserted into the body member 102. A portion of the retaining pin 104 is then locked within the fastener body opening 130 using a combination of the catch members 170 and the stops 188 or ramps 190. The assembled fastener clip 12 may then be coupled to both the vehicle chassis 26 and the trim piece 24 as discussed above.

FIG. 10 is perspective view of another exemplary fastener clip 300 in accordance with an embodiment of the present invention. Fastener clip 300 is substantially similar to fastener clip 12 shown above. Fastener clip 300 includes a body member 302 and a rigid retaining pin 304. In the exemplary embodiment, the body member 302 and the retaining pin 304 are each fabricated from a plastic material as a unitary structure and then separated to form the fastener clip 300 as discussed below. As such, both the body member 302 and the retaining pin 304, and all components included in each, are fabricated as part of a unitary structure to form fastener clip 300. Optionally, the body member 302 and the retaining pin 304 may be fabricated as separate components that are coupled together to form fastener clip 300.

In the exemplary embodiment, the body member 302 is substantially cylindrical to enable the substantially cylindrical fastener clip 300 to be at least partially inserted into a cylindrical opening 29 (shown in FIG. 1) in the vehicle chassis 26 and an opening 331 in trim piece 24 which will be discussed below.

FIG. 11 is a section view of the exemplary fastener clip 300 shown in FIG. 10 in accordance with an embodiment of the present invention. FIG. 12 is another section view of the exemplary fastener clip 300 shown in FIG. 10. As shown in FIGS. 11 and 12, the body member 302 has a first end 314 and a second end 316. The first end 314 is disposed approximately perpendicular to a side 310 of the body member 302. Body member 302 has a diameter 318 that is substantially similar to a diameter 319 of the cylindrical opening 29 in the vehicle chassis 26.

The side 310 of the body member 302 defines an opening 330 that extends therethrough. The body member opening 330 is configured to receive the retaining pin 304 therein. As such, the body member opening 330 extends from the first end 314 to the second end 316 of the body member 302.

The body member 302 also includes a flange member 336 that is disposed proximate to the first end 314 of the body member 302. As shown in FIGS. 11 and 12, the flange member 336 extends outwardly from the body member 302. Optionally, the flange member 336 may have any shape. In use, the flange member 336 increases the strength and rigidity of the fastener clip 300 and also functions as a stop device. More specifically, since the flange member 336 has a dimension 337 that is larger than the dimension 319 of the opening 29 in the vehicle chassis 26, the flange member 336 limits the travel of the fastener clip 300 when the fastener clip 300 is installed into the opening 29 which will be discussed below. In the exemplary embodiment, the flange member 336 is flexible and concave and has a circular cross-sectional profile. The flange member 336 is configured to deform when the fastener clip 300 is installed into the opening 29. This deformation results in a slight pressure being exerted between the vehicle chassis 26 and the fastener clip 300 to limit movement of the fastener clip 300 when installed in the opening 29.

As shown in FIG. 11, the fastener clip 300 also includes a pair of flexible retention legs 340 that are formed between the flange member 336 and the second end 316. The pair of retention legs 340 each have a triangular shape to enable the fastener clip 300 to be inserted within the opening 29 while also retaining the fastener clip 300 within opening 29. More specifically, the pair of retention legs 340 are configured to deform inwardly towards body member 302 to enable the fastener clip 300 to be inserted into opening 29. After the fastener clip 300 is inserted into opening 29, the pair of retention legs 340 are configured to deform outwardly from body member 302 to enable the fastener clip 300 to be retained within opening 29.

As discussed above, the fastener clip 300 is fabricated from a plastic material as a unitary structure, as such, both the body member 302 and the retaining pin 304, and all components included in each, are fabricated as part of the unitary structure of fastener clip 300. For example, in the molding process, the body member 302 is aligned with the retaining pin 304 along a common axis, shown in FIG. 11 as the Z-axis. Molding material is then injected into a mold such that molding gates are formed at an intersection between the body member 302 and the retaining pin 304. This initially results in vestiges being formed at the intersection between the body member 302 and the retaining pin 304 as discussed above in the previous embodiment. After the molding process is completed, the molding gates or vestiges are broken by moving the retaining pin 304 along the Z-axis with respect to the body member 302. Specifically, the retaining pin 304 is forced into the body member opening 330.

Referring again to FIG. 12, the retaining pin 304 includes a cylindrical body 360 having a first end 362 and a second end 364. The retaining pin body 360 is substantially cylindrical to enable the retaining pin 304 to be inserted into the body member opening 330. Thus the retaining pin 304 is configured to move only along a Z-axis as shown in FIG. 11.

As shown in FIG. 12, the retaining pin 304 also includes a pair of catch members 370 that are disposed proximate to the retaining pin second end 364. In the exemplary embodiment, the combination of the retaining pin second end 364 and the catch members 370 form a substantially arrow-shaped member. More specifically, the catch members 370 each have a first end 372 that is formed unitarily with the retaining pin second end 364. The catch members 370 also have a second end 374 that extends outwardly form the retaining pin body 360. The retaining pin 304 also includes a plurality of flexible catch members 371 that radially outwardly from the retaining pin body 360.

In operation, the catch members 370 and 371 enable the retaining pin 304 to be inserted within the body member opening 330 while also securing the retaining pin 304 within the body member 302. More specifically, after the molding process is completed, a portion of the retaining pin 304 that includes the pair of catch members 370 and 371, are forced through the body member opening 330 until the pair of catch members 370 catch members 371 are positioned past a pair of stops 376. The pair of stops 376 then prohibit the retaining pin 304 from being removed from the body member 302 after the retaining pin 304 has been inserted therein.

During installation, the catch members 370 and 371 are each configured to deform inwardly towards body member 302 to enable the retaining pin 304 to be inserted into the body member 302. After the retaining pin 304 is inserted into the body member 302, the catch members 370 and 371 are configured to deform outwardly from the retaining pin body 360 and contact the inner surface of the retaining pin body 360.

As shown in FIGS. 11 and 12, the retaining pin 304 also includes a shoulder 380 that is formed between the catch members 370 and the retaining pin first end 362. In the exemplary embodiment, the shoulder 380 is positioned a predetermined distance from the catch member second ends 374. For example, assuming that it is desired that the trim piece 24 separate from the vehicle chassis 26 by approximately one inch when the airbag is deployed, the shoulder 380 is positioned approximately one inch from the catch member second ends 374. Optionally, retaining pin 304 does not include the shoulder 380. The shoulder 380 may be formed anywhere along the retaining pin 304 between the catch members 370 and the retaining pin first end 362. For example, to increase the distance that the trim piece 24 separates from the chassis 26, the shoulder 380 may be formed nearer the retaining pin first end 362. Optionally, to decrease the distance that the trim piece 24 separates from the chassis 26, the shoulder 380 may be formed nearer the catch members 370.

The retaining pin 304 also includes a trim stop 382 that is disposed on the retaining pin first end 362. As shown in FIGS. 11 and 12, the trim stop 382 is disposed approximately parallel to the shoulder 380 and approximately perpendicular to the body member 302, and thus the body member opening 330. The trim stop 382 is substantially circular and includes a diameter 384. Optionally, the trim stop 382 may have any shape. The trim piece opening 331 includes a first opening 332 and a second opening 333 that is coextensive with the first opening 332. In the exemplary embodiment, the diameter of trim stop 382 is less than a diameter 383 of the first opening 332 to enable the trim stop 382 to be inserted through the opening 331 in the trim piece 24 during installation.

For example, FIG. 13A illustrates a portion of the fastener clip 300 inserted through the opening 331 of the trim piece 24. FIG. 13B illustrates the fastener clip 300 coupled to trim piece 24. As shown in FIG. 13A, and in the exemplary embodiment, the trim stop 382 is inserted through the first opening 332 in the trim piece 24. The fastener clip 300, including trim stop 382 is then moved laterally to engage the second opening 333 that is coextensive with the first opening 332. Since a diameter 387 of the second opening 333 is less than the diameter 384 of the trim stop 382, the trim stop is friction fit into the second opening 333. The trim piece assembly, i.e. the trim piece 24 and fastener clip 300 may then be coupled to the vehicle chassis 26 using the pair of retention legs 340, as shown in FIG. 11. Optionally, the fastener clip 300 may first be coupled to the chassis 26. The trim piece 24 may then be coupled to the fastener clip 300 as described above.

Figure 14:
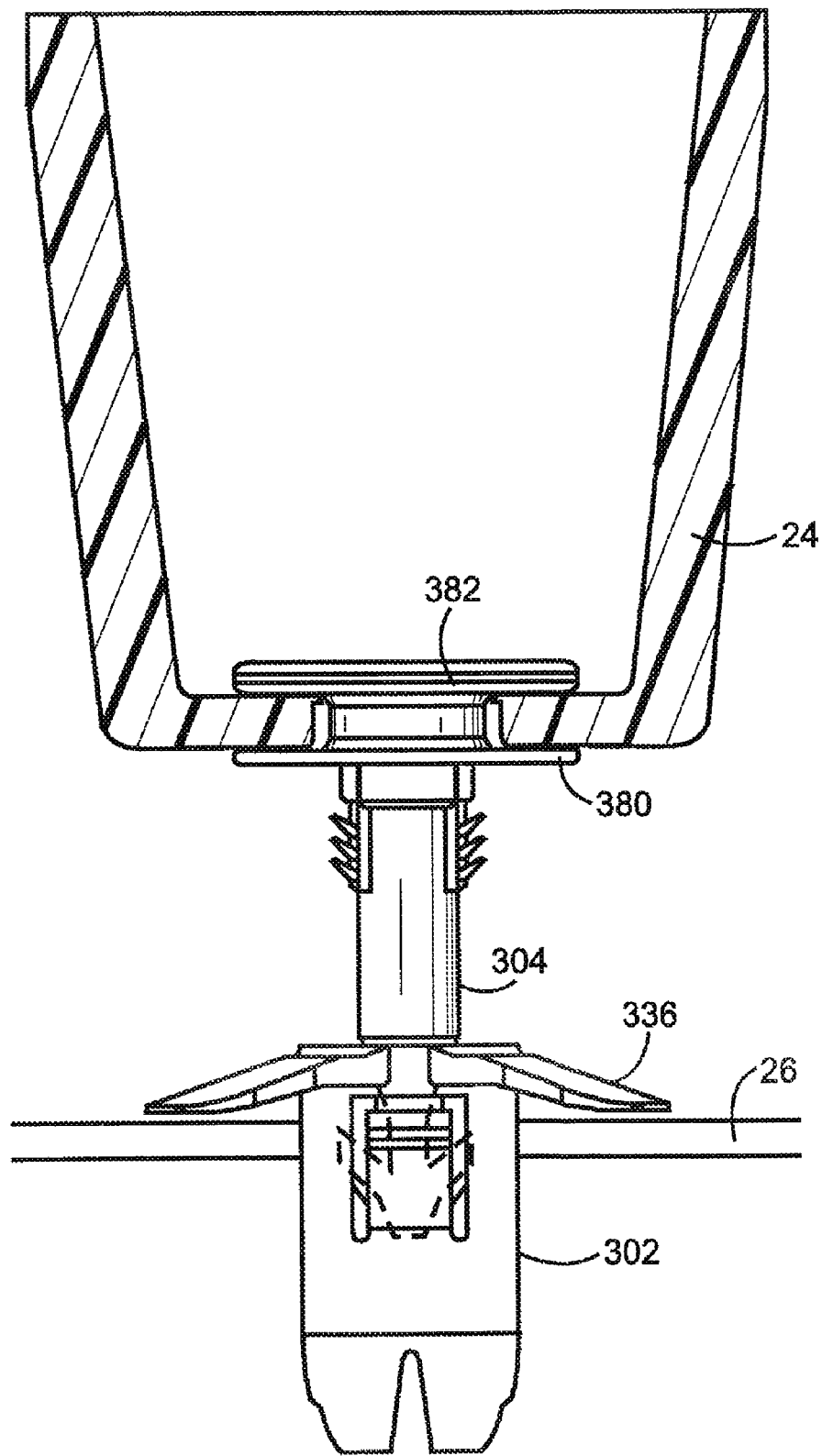
FIG. 14 is a side view of an exemplary airbag retention system that include the fastener clip shown in FIGS. 10-13 in a second operational position in accordance with an embodiment of the present invention.

FIG. 14 illustrates the fastener clip 300 in a deployed position. As shown in FIG. 12, in the standby position, the retaining pin 304 is fully inserted into the body member opening 330. More specifically, the retaining pin 304 is inserted into the body member opening 330 until the retaining pin shoulder 380 contacts the first end 314 of the fastener body 302 as shown in FIG. 12. As discussed above, the shoulder 380 provides a positive stop for the retaining pin 304 when the retaining pin is inserted into the body member opening 330. When the airbag 20 is deployed, i.e. a predetermined force is applied to the trim piece 24, the trim piece 24 moves away from the vehicle chassis 26 as shown in FIG. 14. As shown in FIGS. 13A and 13B, since the diameter of the trim stop 382 is larger than the diameter of the opening in the trim piece 24, the trim piece 24 remains coupled to the fastener clip 300. As such, when the airbag is deployed, both the trim piece 24 and the retaining pin 304 move away from the chassis. This movement continues, until the pair of Catch members 370 make contact with the pair of stops 376. The pair of stops 376 then prohibit the retaining pin 304, and thus the trim piece 24 from moving further from the chassis. As a result, the retaining pin 304 prevents the trim piece 24 from moving a distance from the vehicle chassis 26 that is greater than the predefined distance as discussed above. At this time, the trim piece 24 is prevented from moving away from the chassis by a distance that exceeds a predetermined value by the trim stop 382 of the fastener clip 300.

FIG. 15 is a perspective view of another exemplary fastener clip 400 in accordance with an embodiment of the present invention. The fastener clip 400 includes a body member 402 and a rigid retaining pin 404. In the exemplary embodiment, the body member 402 and the retaining pin 404 are each fabricated from a plastic material as a unitary structure and then separated to form the fastener clip 400 as discussed below. As such, both the body member 402 and the retaining pin 404, and all components included in each, are fabricated as part of a unitary structure to form fastener clip 400. Optionally, the body member 402 and the retaining pin 404 may be fabricated as separate components that are coupled together to form fastener clip 400.

Figures 17, 18:
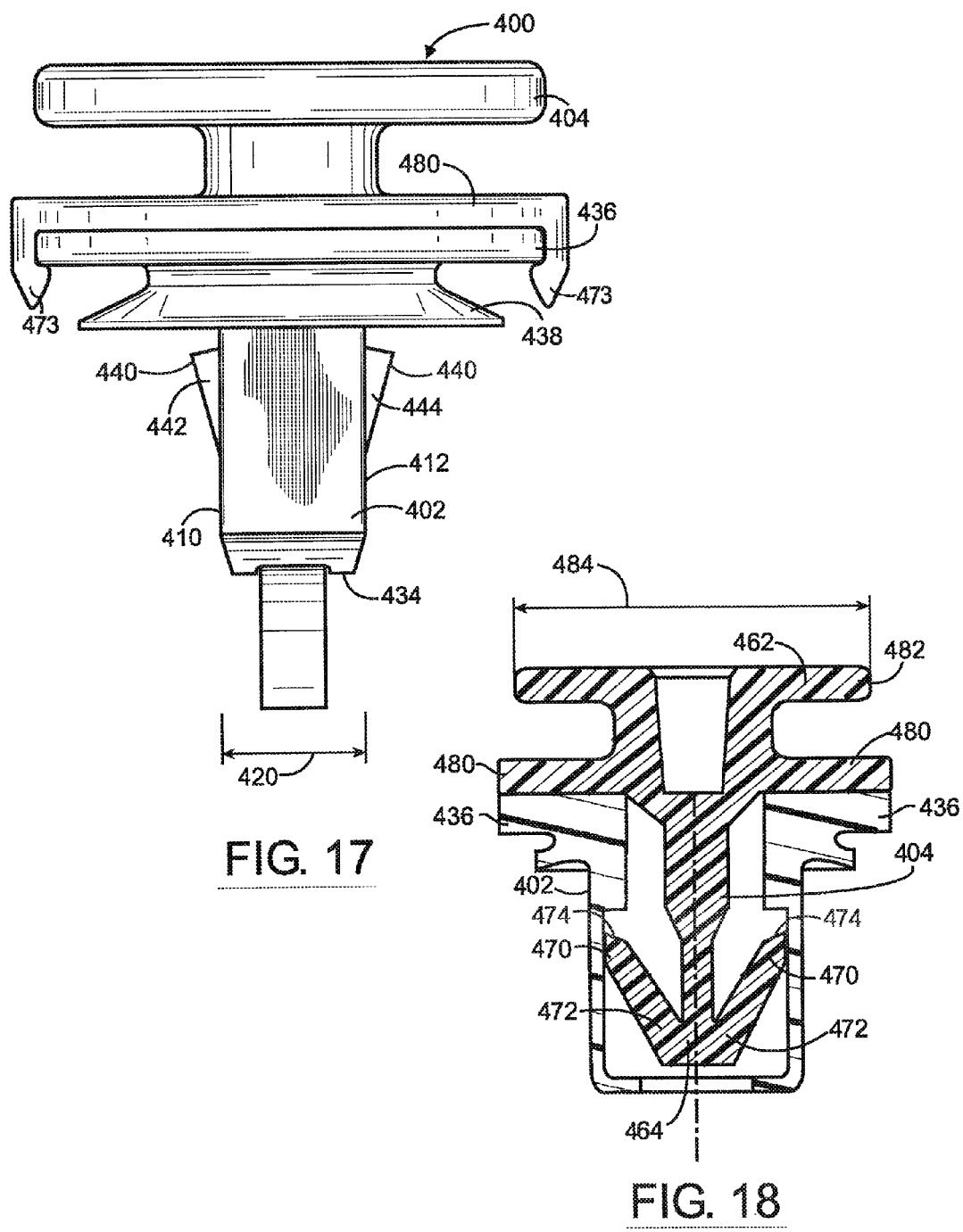
FIG. 17 is another side section view of the exemplary fastener clip shown in FIG. 15 in accordance with an embodiment of the present invention.
FIG. 18 is a side section view of the exemplary fastener clip shown in FIG. 15 in accordance with an embodiment of the present invention.

FIG. 16 is a side section view of the exemplary fastener clip 400 shown in FIG. 15 in accordance with an embodiment of the present invention. FIG. 17 is another side section view of the exemplary fastener clip 400 shown in FIG. 15 in accordance with an embodiment of the present invention. In the exemplary embodiment, the body member 402 has a rectangular cross-sectional profile to enable the fastener clip 400 to be at least partially inserted into the rectangular opening 28 in the vehicle chassis 26 and the rectangular opening 30 in the trim piece 24 (shown in FIG. 2) which will be discussed below. The body member 402 has a length 418 and a width 420 that is less than the length 418. In the exemplary embodiment, the length 418 and width 420 of the body member 402 is slightly less than the length 122 and width 124 of opening 28 to enable the fastener clip 400 to be at least partially inserted into the opening 28 in the vehicle chassis 26. The sides that form body member 402 also define an opening 430 that extends through the fastener body member 402. The fastener body opening 430 is configured to receive the retaining pin 404 therein.

The body member 402 also includes a flange member 436 that is disposed approximately midpoint between the upper and lower surfaces of the body member 402. As shown in FIGS. 16 and 17, the flange member 436 extends outwardly from the body member 402. Optionally, the flange member 436 may have any shape. In use, the flange member 436 increases the strength and rigidity of the fastener clip 400 and also functions as a stop device. More specifically, since the flange member 436 has a diameter that is larger than the size of the opening 28, the flange member 436 limits the travel of the fastener clip 400 when the fastener clip 400 is installed into opening 28 which will be discussed below. The body member 402 may also include a flexible member 438 that is formed between the flange member 436 and a lower surface 434. In the exemplary embodiment, the flexible member 438 is concave and has a circular cross-sectional profile. The flexible member 438 is configured to deform when the fastener clip 400 is installed into the opening 28. This deformation results in a slight pressure being exerted between the vehicle chassis 26 and the fastener clip 400 to limit movement of the fastener clip 400 when installed in the opening 28.

The fastener clip 400 also includes a pair of flexible retention legs 440 that are formed between the flexible member 438 and the lower surface 434. More specifically, the fastener clip 400 includes a first retention leg 442 that is formed in a first side 410 of body member 402 and a second retention leg 444 that is formed in a second side 412 of body member 402. As shown in FIG. 17, the pair of retention legs 440 each has a triangular shape to enable the fastener clip 400 to be inserted within the opening 28 while also retaining the fastener clip 400 within opening 28. Optionally, the retention legs 440 may have a shape other than triangular. More specifically, the pair of retention legs 440 deform inwardly towards body member 402 to enable the fastener clip 400 to be inserted into opening 28. After the fastener clip 400 is inserted into opening 28, the pair of retention legs 440 deform outwardly from body member 402 to enable the fastener clip 400 to be retained within opening 28.

Similar to the fastener clips described above, the fastener clip 400 is fabricated from a plastic material as a unitary structure, as such, both the body member 402 and the retaining pin 404, and all components included in each, are fabricated as part of the unitary structure of fastener clip 400. In the molding position, the body member 402 is aligned with the retaining pin 404 along a common axis, shown in FIG. 16 as the Z-axis. During the molding process, common molding gates are formed at an intersection between the body member 402 and the retaining pin 404. This initially results in vestiges being formed at the intersection between the body member 402 and the retaining pin 404. After the molding process is completed, the molding gates or vestiges are broken by moving the retaining pin 404 along the Z-axis with respect to the body member 402. Specifically, the retaining pin 404 is forced into the fastener body opening 430.

FIG. 18 is a side section view of the exemplary fastener clip 400 shown in FIG. 15 in the installed position in accordance with an embodiment of the present invention. As shown in FIG. 18, the retaining pin body 402 is substantially rectangular to enable the retaining pin 404 to be inserted into the body member opening 430 and the retaining pin trim stop 482 is substantially circular. Optionally, the trim stop 482 may have any shape.

The retaining pin 404 also includes a pair of catch members 470 that are disposed proximate to a retaining pin second end 464. In the exemplary embodiment, the combination of the retaining pin second end 464 and the catch members 470 form a substantially arrow-shaped member. More specifically, the catch members 470 each have a first end 472 that is formed unitarily with the retaining pin second end 464 and a second end 474 that extends outwardly from the retaining pin body 460.

In operation, the catch members 470 enable the retaining pin 404 to be inserted within the body member opening 430 while also securing the retaining pin 404 within the body member 402. More specifically, after the molding process is completed, a portion of the retaining pin 404 that includes the pair of catch members 470, are forced through the body member opening 430 until the pair of catch members 470 are positioned past a pair of stops 476. The pair of stops 476 then prohibit the retaining pin 404 from being removed from the body member 402 after the retaining pin 404 has been inserted therein. Optionally, the retaining pin 404 may also include a pair of catch members 473 that extend outwardly from a shoulder 480 and are configured to "snap" to the flange member 436. During operation, when the airbag is deployed, both the trim piece 24 and the retaining pin 404 move away from the chassis. This movement causes the pair of catch members 473 to disengage from the flange member 436 thus allowing the retaining pin 404 to move away from the body member 402 as is discussed below.

During installation, the catch members 470 are each configured to deform inwardly towards body member 402 to enable the retaining pin 404 to be inserted into the body member 402. After the retaining pin 404 is inserted into the body member 402, the catch members 470 are configured to deform outwardly from the retaining pin body 460 and contact the inner surface of the retaining pin body 460.

As shown in FIG. 18, the retaining pin 404 also includes a shoulder 480. In the exemplary embodiment, the shoulder 480 is positioned a predetermined distance from the catch member second ends 474. For example, assuming that it is desired that the trim piece 24 separate from the vehicle chassis 26 by approximately one inch when the airbag is deployed, the shoulder 480 is positioned approximately one inch from the catch member second ends 474. Optionally, retaining pin 404 does not include the shoulder 480. The shoulder 480 may be formed anywhere along the retaining pin 404 between the catch members 470 and a retaining pin first end 462. For example, to increase the distance that the trim piece 24 separates from the chassis 26, the shoulder 480 may be formed nearer the retaining pin first end 462. Optionally, to decrease the distance that the trim piece 24 separates from the chassis 26, the shoulder 480 may be formed nearer the catch members 470.

The retaining pin 404 also includes a trim stop 482 that is disposed on the retaining pin first end 462. As shown in FIG. 18, the trim stop 482 is disposed approximately parallel to the shoulder 480 and approximately perpendicular to the body member 402, and thus the body member opening 430. The trim stop 482 is substantially circular and includes a diameter 484. Optionally, the trim stop 482 has a shape other than circular. In the exemplary embodiment, the fastener clip 400 is configured to be installed into the exemplary trim piece 24 shown in FIGS. 13A and 13B. Referring to FIGS. 13A and 13B, the trim piece 24 includes the trim piece opening 331 includes a first opening 332 and a second opening 333 that is coextensive with the first opening 332. In the exemplary embodiment, the diameter of trim stop 482 is less than a diameter 383 of the first opening 332 to enable the trim stop 482 to be inserted through the opening 331 in the trim piece 24 during installation.

For example, as shown in FIG. 13A, and in the exemplary embodiment, the trim stop 482 is inserted through the first opening 332 in the trim piece 24. The fastener clip 400, including trim stop 482 is then moved laterally to engage the second opening 333 that is coextensive with the first opening 332. Since a diameter 387 of the second opening 333 is less than the diameter 484 of the trim stop 482, the trim stop is either friction fit into the second opening 333 or may be secured in the second opening 333 using a mechanical lock formed as part of the trim piece itself. The trim piece assembly, i.e. the trim piece 24 and fastener clip 400 may then be coupled to the vehicle chassis 26 using the pair of retention legs 440, as shown in FIG. 17. Optionally, the fastener clip 400 may first be coupled to the chassis 26. The trim piece 24 may then be coupled to the fastener clip 400 as described above.

Figure 19:
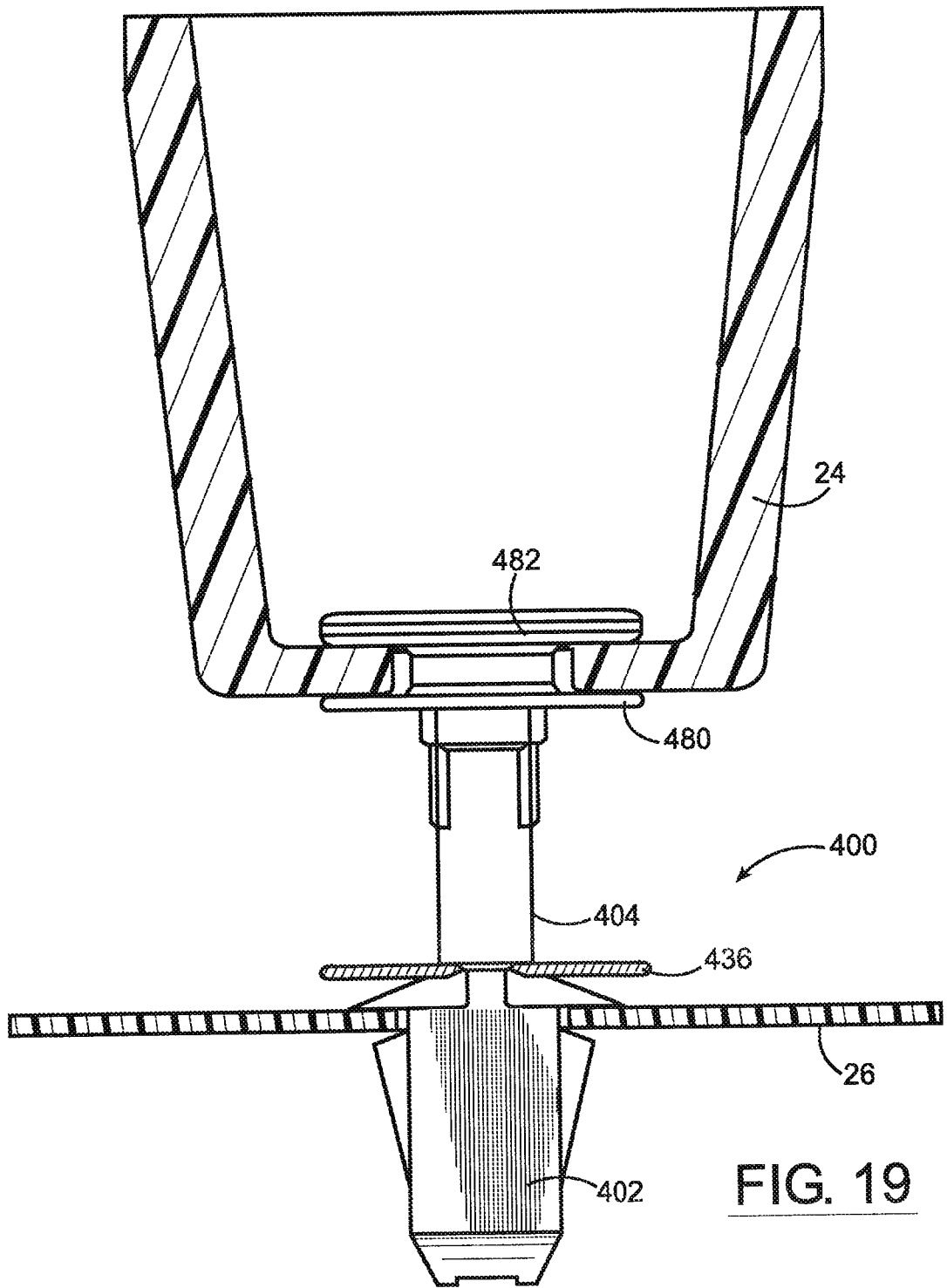
FIG. 19 is an exemplary airbag retention system that includes the fastener clip shown in FIGS. 15-18 in a second operational position in accordance with an embodiment of the present invention.

FIG. 19 illustrates the fastener clip 400 in a deployed position. As shown in FIG. 18, in the standby position, the retaining pin 404 is fully inserted into the body member opening 430. More specifically, the retaining pin 404 is inserted into the body member opening 430 until the retaining pin shoulder 480 contacts the flange member 436. As discussed above, the flange member 436 provides a positive stop for the retaining pin 404 when the retaining pin 404 is inserted into the body member opening 430. When the airbag 20 is deployed, i.e. a predetermined force is applied to the trim piece 24, the trim piece 24 moves away from the vehicle chassis 26 as shown in FIG. 19. As shown in FIGS. 13A and 13B, since the dimension of the trim stop 482 is larger than the dimension of the opening in the trim piece 24, the trim piece 24 remains coupled to the fastener clip 400. As such, when the airbag is deployed, both the trim piece 24 and the retaining pin 404 move away from the chassis. This movement continues, until the pair of catch members 470 make contact with the pair of stops 476. The pair of stops 476 then prohibit the retaining pin 404, and thus the trim piece 24, from moving further from the chassis. As a result, the retaining pin 404 prevents the trim piece 24 from moving a distance from the vehicle chassis 26 that is greater than the predefined distance as discussed above. At this time, the trim piece 24 is prevented from moving away from the chassis by a distance that exceeds a predetermined value by the trim stop 482 of the fastener clip 300.

Figure 20:
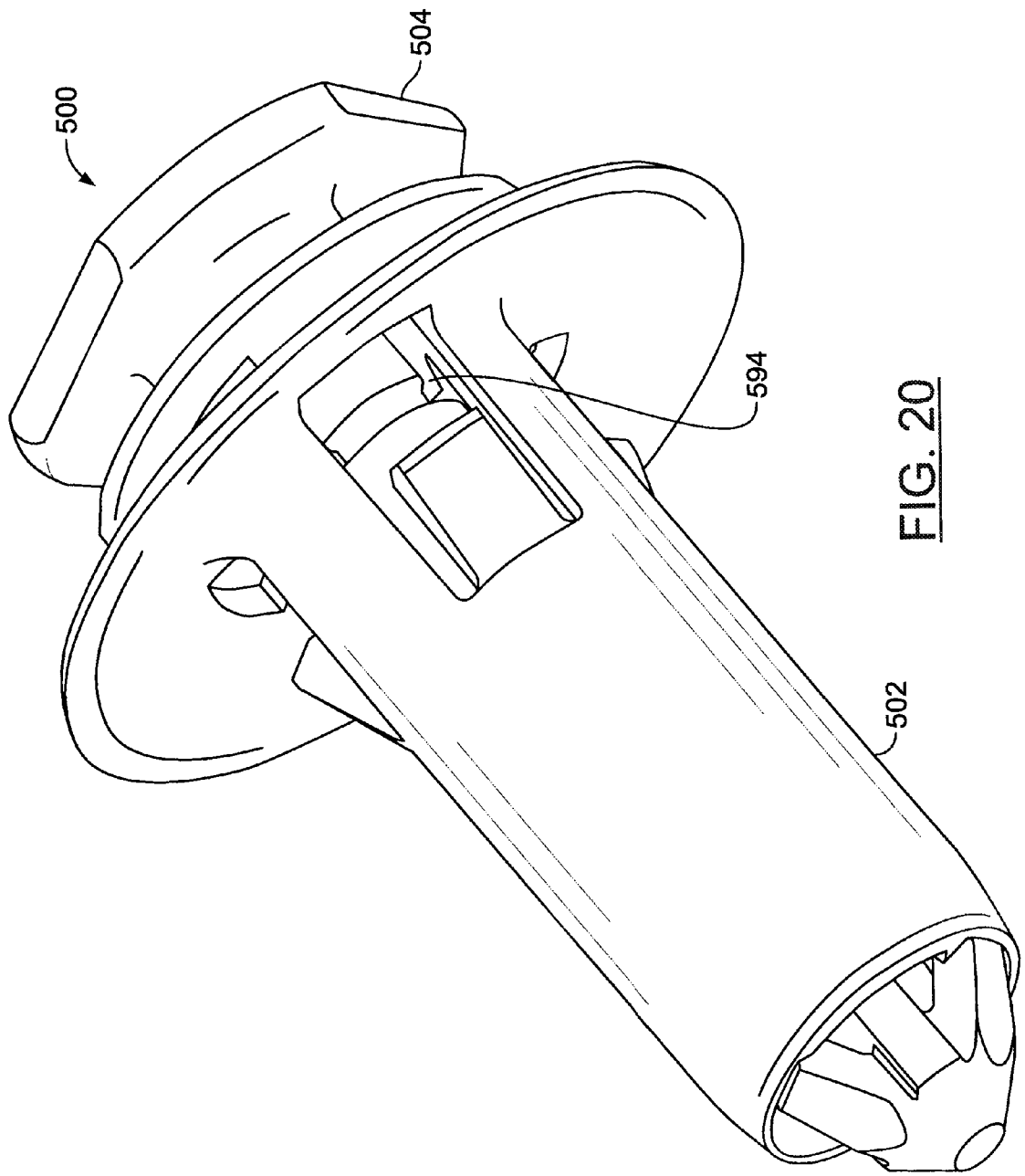
FIG. 20 is a perspective view of another exemplary fastener clip in accordance with an embodiment of the present invention.

FIG. 20 is perspective view of another exemplary fastener clip 500 in accordance with an embodiment of the present invention. Fastener clip 500 includes a body member 502 and a rigid retaining pin 504. In the exemplary embodiment, the body member 502 and the retaining pin 504 are each fabricated from a plastic material as separate unitary structures and then coupled together to form the fastener clip 500 as discussed below. In the exemplary embodiment, the body member 502 is substantially cylindrical to enable the substantially cylindrical fastener clip 500 to be at least partially inserted into a cylindrical opening 29 (shown in FIG. 1) in the vehicle chassis 26 and an opening 331 in trim piece 24 which will be discussed below.

FIG. 21 is a side view of the exemplary body member 502 shown in FIG. 20 in accordance with an embodiment of the present invention. As shown in FIG. 21, the body member 502 has a first end 514 and an opposite second end 516. The first end 514 is disposed approximately perpendicular to a side 510 of the body member 502. Body member 502 has a diameter 518 that is substantially similar to a diameter 319 of the cylindrical opening 29 in the vehicle chassis 26.

The side 510 of the body member 502 defines an opening 530 that extends therethrough. The body member opening 530 is configured to receive the retaining pin 504 therein. As such, the body member opening 530 extends from the first end 514 to the second end 516 of the body member 502.

The body member 502 also includes a flange member 536 that is disposed proximate to the first end 514 of the body member 502. As shown in FIGS. 20 and 21, the flange member 536 extends outwardly from the body member side 510. In use, the flange member 536 increases the strength and rigidity of the fastener clip 500 and also functions as a stop device. More specifically, since the flange member 536 has a diameter 537 that is larger than the diameter 319 of the opening 29 in the vehicle chassis 26, the flange member 536 limits the travel of the fastener clip 500 when the fastener clip 500 is installed into the opening 29 which will be discussed below. In the exemplary embodiment, the flange member 536 is circular, flexible and concave. The flange member 536 is configured to deform when the fastener clip 500 is installed into the opening 29. This deformation results in a slight pressure being exerted between the vehicle chassis 26 and the fastener clip 500 to limit movement of the fastener clip 500 when installed in the opening 29.

As shown in FIG. 21, the fastener clip 500 also includes a plurality of flexible retention legs 540 that are formed between the flange member 536 and the second end 516. In the exemplary embodiment, the fastener clip 500 includes three retention legs 540 that are each spaced apart by approximately 120 degrees. It should be realized that fastener clip 500 may have two or more retention legs 540. The plurality of retention legs 540 each have a triangular shape to enable the fastener clip 500 to be inserted within the opening 29 while also retaining the fastener clip 500 within opening 29. More specifically, the plurality of retention legs 540 are configured to deform inwardly towards body member 502 to enable the fastener clip 500 to be inserted into opening 29. After the fastener clip 500 is inserted into opening 29, the retention legs 540 are configured to deform outwardly from body member 502 to enable the fastener clip 500 to be retained within opening 29.

FIG. 22 is a bottom view of the body member 502 shown in FIGS. 20 and 21. As shown in FIG. 22, the body member 502 includes a first set of channels 542, referred to herein as installation channels 542 and a second set of channels 544, that are referred to herein as operational channels 544. As shown in FIG. 22, and in the exemplary embodiment, body member 502 includes N installation channels 542 and N operational channels 544 that are parallel to the N installation channels 542. In the exemplary embodiment, N is equal to the quantity of catch members 570 (shown in FIG. 23) installed on the retaining pin 504. For example, in the exemplary embodiment, the retaining pin 504 includes three catch members 570, therefore the body member 502 includes three installation channels 542 and three operational channels 544. As shown in FIG. 22, each of the respective operational channels 544 is disposed between an adjacent pair of installation channels 542. Accordingly, each respective installation channel 542 is disposed between a pair of operation channels 544.

Each operational channel 544 includes a channel surface 546 and a pair of channel walls 548 that are disposed on opposite sides of the channel surface 546. During operation, a single catch member 570 is disposed between and maintained within the respective operational channel 544 via the pair of channel walls 548. In the exemplary embodiment, the fastener clip 500 includes three operational channels 544 and thus includes three pairs of channel walls 548, or one pair per operational channel 544. As shown in FIG. 22, the channel walls 548 extend axially along the inner surface of the body member 502. The channel walls 548 extend from the fastener first end 514 towards the fastener second end 516. In the exemplary embodiment, the channel walls 548 have a length 550 that is slightly less than a length 552 of the body member 502 to enable sufficient clearance for the fastener pin 504 to be rotated within the body member 502 as will be discussed below. Each installation channel 542 also includes a depth 554 and each operational channel 544 has a depth 556 that is greater than the installation channel depth 554.

The body member 502 also includes a plurality of fastener pin stops 576. In the exemplary embodiment, the body member 502 includes N pin stops 576 that are adapted to prohibit the retaining pin 504 from being removed from the body member 502 after the retaining pin 504 has been inserted therein. In the exemplary embodiment, the body member 502 includes three pin stops 576, wherein each respective pin stop 576 is disposed within a respective operation channel 544 proximate to the first end 514. As shown in FIG. 22, the combination of the pair of channel walls 548 and a single pin stop 576 form a substantially three-sided operational channel 544, wherein the pair of channel walls 548 substantially limit the movement of the retaining pin 504 in a radial direction and the pin stop 576 limits the movement of the retaining pin 504 in an axial direction towards the first end 514.

Figure 23:
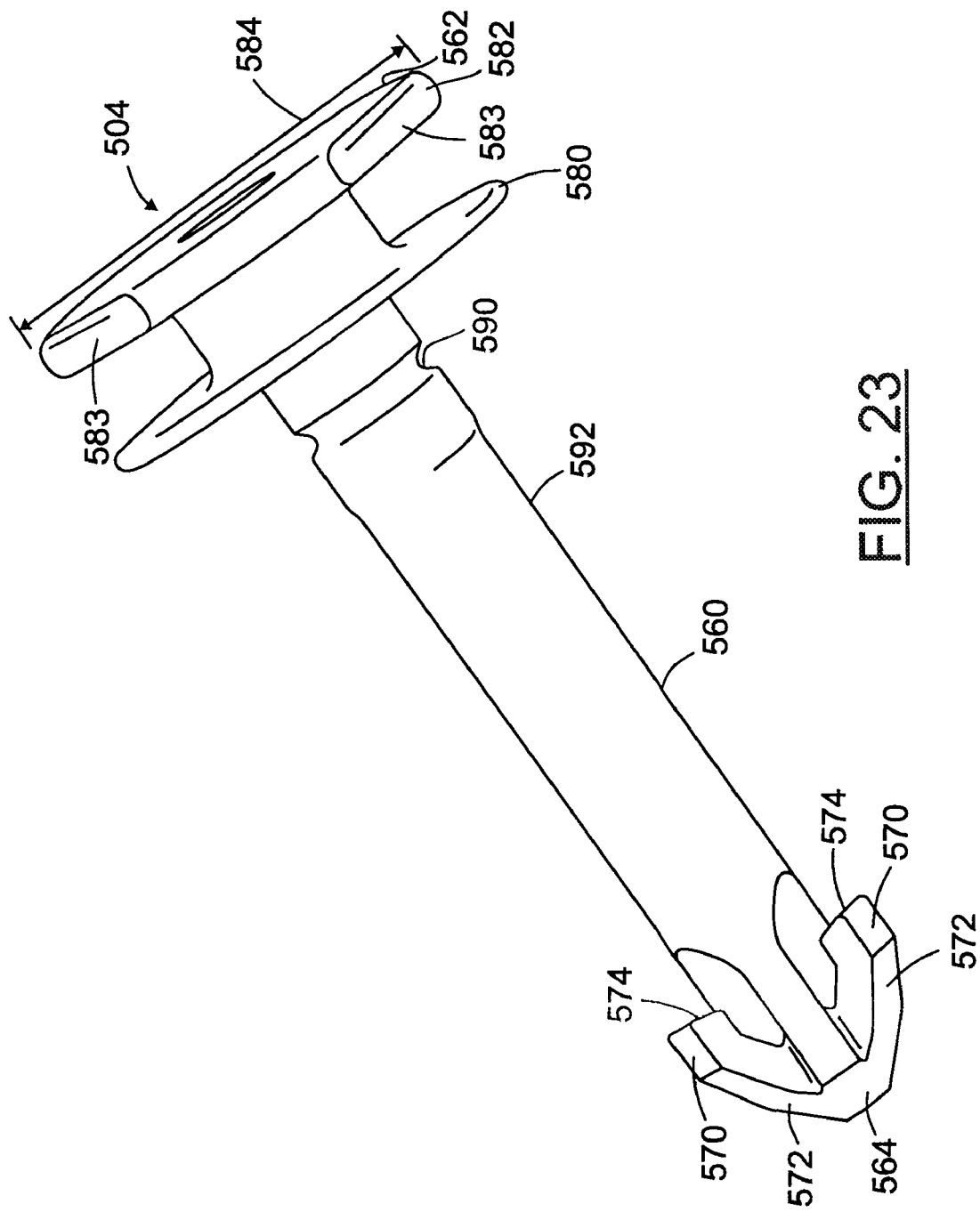
FIG. 23 is a side view of another portion of the exemplary fastener clip shown in FIG. 20 in accordance with an embodiment of the present invention.

FIG. 23 is a side view of the exemplary retaining pin 504. The retaining pin 504 includes a cylindrical body 560 having a first end 562 and a second end 564. The retaining pin body 560 is substantially cylindrical to enable the retaining pin 504 to be inserted into the body member opening 530. As shown in FIG. 23, the retaining pin 504 also includes N catch members 570 that are disposed proximate to the retaining pin second end 564. More specifically, the body member includes N=3 operational channels and the retaining pin 504 includes N=3 catch members 570 that are each adapted to move within a respective operational channel 544. In the exemplary embodiment, the combination of the retaining pin second end 564 and the catch members 570 form a substantially arrow-shaped member. More specifically, the catch members 570 each have a first end 572 that is formed unitarily with the retaining pin second end 564 and a second end 574 that extends outwardly form the retaining pin body 560.

In operation, the catch members 570 enable the retaining pin 504 to be inserted within the body member opening 530 while also securing the retaining pin 504 within the body member 502 which will be discussed in more detail below. The retaining pin 504 also includes a shoulder 580 that is formed between the catch members 570 and the retaining pin first end 562. In the exemplary embodiment, the shoulder 580 is positioned a predetermined distance from the catch member second ends 574. For example, assuming that it is desired that the trim piece 24 separate from the vehicle chassis 26 by approximately one inch when the airbag is deployed, the shoulder 580 is positioned approximately one inch from the catch member second ends 574. Optionally, retaining pin 504 does not include the shoulder 580. The shoulder 580 may be formed anywhere along the retaining pin 504 between the catch members 570 and the retaining pin first end 562. For example, to increase the distance that the trim piece 24 separates from the chassis 26, the shoulder 580 may be formed nearer the retaining pin first end 562. Optionally, to decrease the distance that the trim piece 24 separates from the chassis 26, the shoulder 580 may be formed nearer the catch members 570.

The retaining pin 504 also includes a trim stop 582 that is disposed on the retaining pin first end 562. As shown in FIG. 23, the trim stop 582 is disposed approximately parallel to the shoulder 580 and approximately perpendicular to the body member 502, and thus the body member opening 530. The trim stop 582 is substantially hexagonal and includes a plurality of "flats" 583 that enable an operator to grasp and operate the retaining pin 504. Optionally, the trim stop 582 may have any shape that facilitates allowing an operator to turn or move the retaining pin 504. The trim stop 582 also has a diameter 584. The trim piece opening 331 (shown in FIGS. 13A and 13B) includes a first opening 332 and a second opening 333 that is coextensive with the first opening 332. In the exemplary embodiment, the diameter 584 of trim stop 582 is less than a diameter 383 of the first opening 332 to enable the trim stop 582 to be inserted through the opening 331 in the trim piece 24 during installation.

The retaining pin 504 also includes a channel or groove 590 that is formed in a radial direction around an outer surface 592 of the retaining pin body. In the exemplary embodiment, the groove 590 is adapted to receive a plurality of flexible tabs 594 that are shown in FIGS. 20 and 22. During operation, the flexible tabs 594 that are formed with or coupled to the body member 502 cooperate with the groove 590 to resist the retaining pin 504 from being removed from the body member 502 after installation.

Figure 24:
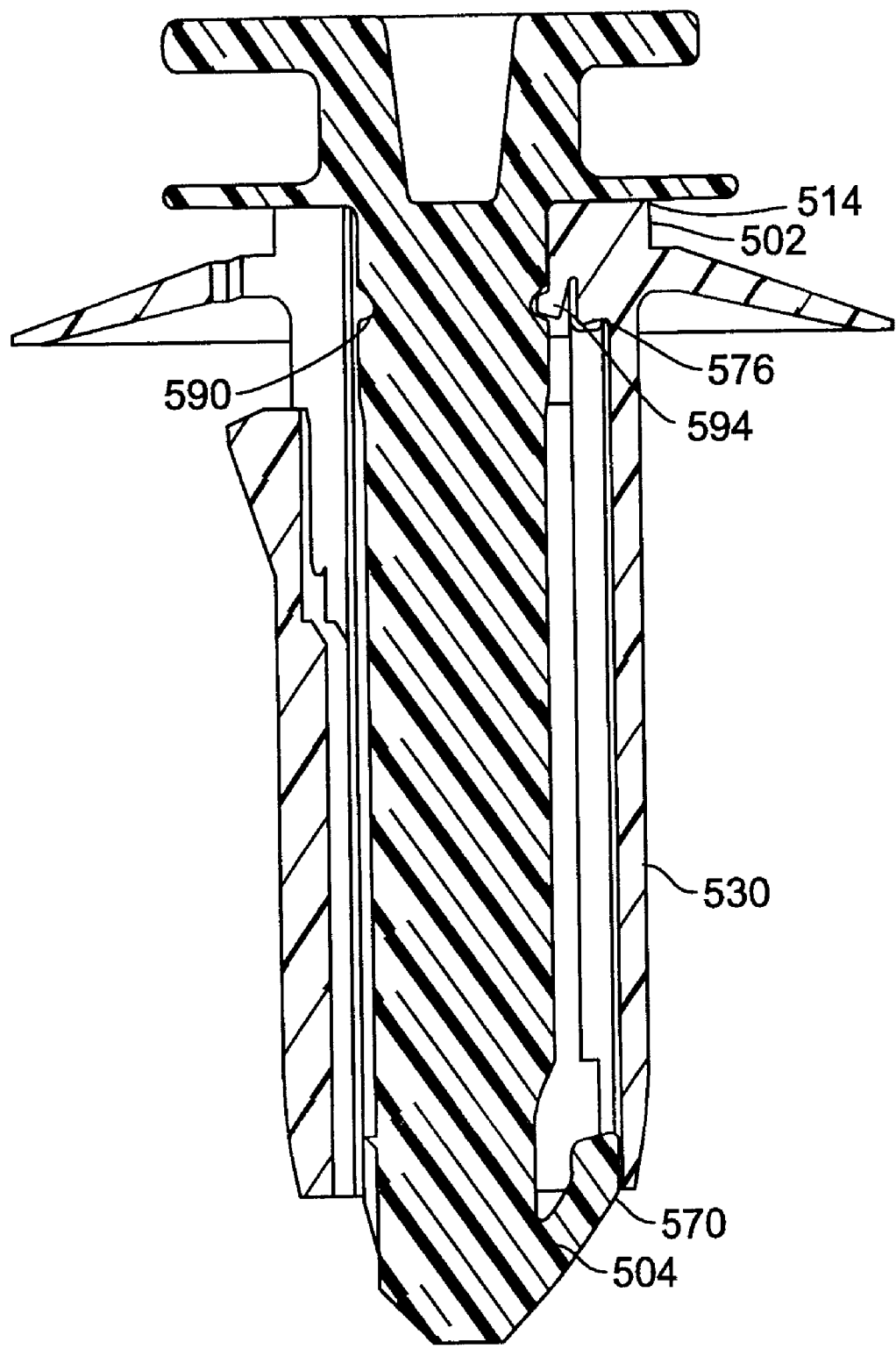
FIG. 24 is side section view of the exemplary fastener clip shown in FIG. 20 in accordance with an embodiment of the present invention.

To assemble the fastener device 500, the second end 564 of retainer pin 504 is positioned proximate to and axially aligned with the first end 514 of the body member 502 and such that retaining pin catch members 570 are axially aligned with the installation channels 542. More specifically, each pin catch member 570 is axially aligned with a respective installation channel 542. During installation, the retaining pin catch members 570 are retained within the installation channels 542 via the channel walls 548. The retaining pin 504 is inserted into the body member 502 until the shoulder 580 of the retaining pin 504 contacts the first end 514 of the body member 502 as shown in FIG. 24. At this point, the plurality of flexible tabs 594 deflect radially inwardly and seat within the groove 590. During operation, the plurality of flexible tabs 594 provide some resistance to inhibit the retaining pin 504 from being removed from the body member 502 during normal operation, i.e. when the airbag is not deployed. However, it should be realized that the resistance or pressure exerted on the groove 590 by the flexible tabs 594 is less than the pressure exerted by the airbag during deployment such that during airbag deployment, the flexible tabs 594 disengage from the groove 590 to enable the trim piece 24 to separate from the vehicle chassis 26.

Once the retaining pin 504 is inserted into the body member 502 until the shoulder 580 of the retaining pin 504 contacts the first end 514 of the body member 502, the retaining pin 504 is rotated until the catch members 570 are disposed within the operational channels 544. More specifically, as shown in FIG. 22, the body member 502 includes a small gap that is formed in the channel walls 548 to enable the retaining pin catch members 570 to be repositioned or moved from the installation channels 542 to the operational channels 544. As discussed above, the operational channels 544 have a depth 556 that is greater than the depth 554 of the installation channels. Accordingly, when the retaining pin 504 is rotated, via the flats 583, and the catch members 570 move radially from the installation channels 542 into the operational channels 544, the flexible catch members 570 deform or deflect radially outwardly until they contact the channel surface 546. At this point, the retaining pin 504 is inhibited from rotating within the body member 502 because the catch members 570 are each radially securing within a respective operational channel 544. Moreover, when the flexible catch members 570 deform or deflect radially outwardly within the operational channel 544, the deflection of the catch members 570 causes an audible and tactile indication to the operator, thus allowing an operator to know when the retaining pin 504 is correctly installed within the body member 502. The exemplary fastener clip may then be installed within the vehicle.

For example, referring again to FIG. 13A, the trim stop portion 582 of the fastener clip 500 is inserted through the opening 331 of the trim piece 24. The fastener clip 500, including trim stop 582 is then moved laterally to engage the second opening 333 that is coextensive with the first opening 332. Since a diameter 387 of the second opening 333 is less than the diameter 584 of the trim stop 582, the trim stop 582 is friction fit into the second opening 333. The trim piece assembly, i.e. the trim piece 24 and fastener clip 500 may then be coupled to the vehicle chassis 26 using the pair of retention legs 540, as shown in FIG. 21. Optionally, the fastener clip 500 may first be coupled to the chassis 26. The trim piece 24 may then be coupled to the fastener clip 500 as described above.

FIG. 24 illustrates the fastener clip 500 in a standby or non-deployed position. As shown in FIG. 24, in the standby position, the retaining pin 504 is fully inserted into the body member opening 530. When the airbag 20 is deployed, i.e. a predetermined force is applied to the trim piece 24, the trim piece 24 moves away from the vehicle chassis 26. As shown in FIGS. 13A and 13B, since the dimension of the trim stop 582 is larger than the dimension of the opening 332 in the trim piece 24, the trim piece 24 remains coupled to the fastener clip 500. As such, when the airbag is deployed, both the trim piece 24 and the retaining pin 504 move away from the vehicle chassis 26. This movement causes the flexible tabs 594 to disengage from the groove 590 since the pressure exerted on the groove 590 by the flexible tabs 594 is less than the pressure exerted by the airbag during deployment. The retaining pin 504 continues to move away from the body member 502 until the plurality of catch members 570 make contact with the plurality of stops 576 (shown in FIGS. 22 and 24). The plurality of stops 576 then prohibit the retaining pin 504, and thus the trim piece 24 from moving further from the chassis. As a result, the retaining pin 504 prevents the trim piece 24 from moving a distance from the vehicle chassis 26 that is greater than the predefined distance as discussed above. At this time, the trim piece 24 is prevented from moving away from the chassis by a distance that exceeds a predetermined value by the trim stop 582 of the fastener clip 500.

Described herein are fastener clips utilized to secure a trim piece to a vehicle chassis when the airbag is deployed. The fastener clips include a body fixedly coupled to a vehicle chassis and having an opening extending therethrough. In one embodiment, the opening is rectangular to receive a rectangular fastener clip body. Optionally, the opening is circular to receive a cylindrically shaped body. A rigid retaining pin is inserted through an opening in the fastener clip body. The rigid retaining pin has a first end that is secured within the body and a second end that is disposed outside the body. The rigid retaining pin includes an integral trim stop that limits the movement of a vehicle trim piece with respect to the vehicle chassis when the airbag is deployed.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastener clip configured for use with a vehicle trim piece, a vehicle chassis, and an airbag, the fastener clip comprising:
    a body having an opening extending therethrough, wherein the body includes a pair of flexible retention legs configured to secure the vehicle trim piece to the vehicle chassis and configured to separate from the vehicle trim piece when the airbag is deployed; and
    a rigid retaining pin inserted through the opening, the rigid retaining pin having a first end secured within the body and a second end disposed outside the body, the retaining pin configured to limit the movement of the vehicle trim piece with respect to the vehicle chassis when the airbag is deployed.

2. A fastener clip in accordance with claim 1 further comprising a plurality of molding gates formed at an intersection between the body and the rigid retaining pin, the rigid retaining pin being subsequently movable with respect to the body after the molding gates are broken.

3. A fastener clip in accordance with claim 1 wherein the body comprises a pair of flexible retention legs adapted to secure the fastener clip to the vehicle chassis.

4. A fastener clip in accordance with claim 1, wherein the rigid retaining pin further comprises a rectangular trim stop adapted to limit the movement of the trim piece when the airbag is deployed.

5. A fastener clip in accordance with claim 1, wherein the rigid retaining pin further comprises a rectangular trim stop adapted to limit the movement of the trim piece when the airbag is deployed, the trim stop is disposed approximately perpendicular to the opening in the body.

6. A fastener clip in accordance with claim 1, wherein the trim piece has a rectangular opening and the rigid retaining pin further comprises a rectangular trim stop adapted to extend through the rectangular opening and retain the trim piece when the airbag is deployed.

7. A fastener clip in accordance with claim 1, wherein the trim piece has a circular opening and the rigid retaining pin further comprises a circular trim stop adapted to extend through the circular opening and retain the trim piece when the airbag is deployed.

8. A fastener clip in accordance with claim 1 wherein the rigid retaining pin further comprises a pair of catch members coupled to the rigid retaining pin first end, the pair of catch members are deformable to enable the rigid retaining pin to be inserted through the opening in the body.

9. A fastener clip in accordance with claim 1 wherein the body further comprises a pair of stops adapted to engage a pair of catch members to limit the movement of the rigid retaining pin after the airbag has been deployed.

10. A side airbag retention system for use in conjunction with a vehicle including a vehicle chassis, an airbag coupled to the vehicle chassis, and a trim piece adapted to cover the airbag, said airbag retention system comprising:
    a fastener clip including
    a body having an opening extending therethrough, wherein the body is configured to be inserted into the vehicle chassis and includes a pair of flexible retention legs configured to secure the trim piece to the vehicle chassis and configured to separate from the trim piece when the airbag is deployed; and
    a rigid retaining pin inserted through the opening, the rigid retaining pin having a first end secured within the body and a second end disposed outside the body, the retaining pin configured to limit the movement of the trim piece with respect to the vehicle chassis when the airbag is deployed.

11. A side airbag retention system in accordance with claim 10 wherein the fastener clip further comprises a plurality of molding gates formed at an intersection between the body and the rigid retaining pin, the rigid retaining pin being subsequently movable with respect to the body after the molding gates are broken.

12. A side airbag retention system in accordance with claim 10 wherein the fastener clip further comprises a rectangular trim stop adapted to limit the movement of the trim piece when the airbag is deployed.

13. A fastener clip comprising:
    a body member having an opening extending therethrough, wherein the body member includes a first set of channels, a second set of channels formed parallel to the first set of channels, and a plurality of flexible tabs; and
    a rigid retaining pin inserted through the opening, the rigid retaining pin including a plurality of catch members configured to be inserted into the first set of channels in a first mode of operation and configured to be inserted into the second set of channels during a second mode of operation, wherein the retaining pin comprises a radial groove configured to receive the plurality of flexible tabs, and wherein the plurality of flexible tabs are configured to separate from the radial groove when an airbag is deployed.

14. A fastener clip in accordance with claim 13 wherein the second plurality of channels are adapted to limit the movement of the rigid retaining pin when an airbag is deployed.

15. A fastener clip in accordance with claim 13 wherein the rigid retaining pin includes N catch members and the first and second set of channels each include N channels.

16. A fastener clip in accordance with claim 13 wherein the second set of channels each comprise a fastener pin stop that is configured to retain the retaining pin within the second set of channels.

* * * * *